US011296512B2

United States Patent
Kanou et al.

(10) Patent No.: US 11,296,512 B2
(45) Date of Patent: Apr. 5, 2022

(54) POWER CONTROLLER APPARATUS FOR POWER SYSTEM INCLUDING CUSTOMER FACILITIES WITH POWER STORAGE APPARATUSES

(71) Applicant: PANASONIC INTELLECTUAL PROPERTY MANAGEMENT CO., LTD., Osaka (JP)

(72) Inventors: Junichi Kanou, Osaka (JP); Akira Minegishi, Osaka (JP); Tetsuyoshi Ogura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/272,072

(22) PCT Filed: Jun. 19, 2019

(86) PCT No.: PCT/JP2019/024273
§ 371 (c)(1),
(2) Date: Feb. 26, 2021

(87) PCT Pub. No.: WO2020/044743
PCT Pub. Date: Mar. 5, 2020

(65) Prior Publication Data
US 2021/0328433 A1    Oct. 21, 2021

(30) Foreign Application Priority Data
Aug. 28, 2018  (JP) .............................. JP2018-159311

(51) Int. Cl.
*H02J 3/32*  (2006.01)
*H02J 3/00*  (2006.01)
(Continued)

(52) U.S. Cl.
CPC ................ *H02J 3/32* (2013.01); *H02J 3/003* (2020.01); *H02J 3/004* (2020.01); *H02J 3/14* (2013.01);
(Continued)

(58) Field of Classification Search
CPC .... H02J 3/003; H02J 3/004; H02J 3/14; H02J 3/32
(Continued)

(56) References Cited

U.S. PATENT DOCUMENTS

2017/0104343 A1* 4/2017 ElBsat .................... H02J 3/32

FOREIGN PATENT DOCUMENTS

JP   2014-063576 A   4/2014
JP   6163040 B2      7/2017
(Continued)

OTHER PUBLICATIONS

English translation of the International Preliminary Report on Patentability issued in International Application No. PCT/JP2019/024273, dated Mar. 11, 2021.
(Continued)

*Primary Examiner* — Hal Kaplan
(74) *Attorney, Agent, or Firm* — McDermott Will & Emery LLP

(57) ABSTRACT

A reference capacity determiner determines a reference capacity of each power storage apparatus, under an assumption that power is not transmitted/received among the customer facilities. An actual capacity determiner determines an actual capacity of each power storage apparatus, under an assumption that power is transmitted/received among the customer facilities. A characteristic value determiner determines a first number of charging/discharging cycles, under an assumption that power is not transmitted/received among the customer facilities and each power storage apparatus has
(Continued)

the reference capacity. A charging/discharging plan determiner determines a second number of charging/discharging cycles, under an assumption that power is transmitted/received among the customer facilities and each power storage apparatus has the actual capacity, and determine a charging/discharging plan of the power storage apparatuses so as to minimize an objective function indicating a degree of degradation from the first number of cycles to the second number of cycles.

16 Claims, 25 Drawing Sheets

(51) Int. Cl.
*H02J 7/00* (2006.01)
*H02J 3/14* (2006.01)
(52) U.S. Cl.
CPC .......... *H02J 7/005* (2020.01); *H02J 7/0013* (2013.01); *H02J 7/0048* (2020.01)

(58) Field of Classification Search
USPC .......................................................... 307/20
See application file for complete search history.

(56) References Cited

FOREIGN PATENT DOCUMENTS

| | | |
|---|---|---|
| JP | 2018-023188 A | 2/2018 |
| JP | 2018-023260 A | 2/2018 |

OTHER PUBLICATIONS

International Search Report issued in International Patent Application No. PCT/JP2019/024273, dated Sep. 10, 2019; with English translation.

* cited by examiner

POWER CONTROLLER APPARATUS FOR POWER SYSTEM INCLUDING CUSTOMER FACILITIES WITH POWER STORAGE APPARATUSES

CROSS-REFERENCE OF RELATED APPLICATIONS

This application is the U.S. National Phase under 35 U.S.C. § 371 of International Patent Application No. PCT/JP2019/024273, filed on Jun. 19, 2019, which in turn claims the benefit of Japanese Application No. 2018-159311, filed on Aug. 28, 2018, the entire disclosures of which applications are incorporated by reference herein.

TECHNICAL FIELD

The present disclosure relates to a power controller apparatus for a power system including a plurality of customer facilities. The present disclosure also relates to a power system including such a power controller apparatus and customer facilities.

BACKGROUND ART

Some customers of commercial power (electric power) use a customer facility provided with a power storage apparatus and/or a power generator apparatus, as well as various load apparatuses consuming power. By using the power storage apparatus, it is possible to reduce a peak of power consumed by the load apparatuses of the customer facility. In addition, by using the power generator apparatus, it is possible to reduce power consumption and price of the commercial power.

As a result of power generator apparatuses, such as solar cells, it is expected that there will be an increased demand for power storage apparatuses in order for a load apparatus of a customer facility to efficiently consume power generated by a power generator apparatus of the same customer facility.

The larger the capacity of the power storage apparatus increases, the higher the price is. If a too large-capacity and too expensive power storage apparatus is used, then it is difficult to recover initial investment costs. On the other hand, if a small-capacity power storage apparatus is used in order to reduce costs, then its stored electric energy readily reaches an upper limit or a lower limit, resulting in waste of generated power, or failure to supply power to a load apparatus in an emergency, such as power interruption. Therefore, for example, as disclosed in Patent Document 1, it has been proposed to transmit and receive power among a plurality of customer facilities of a power system, the plurality of customer facilities each provided with a power storage apparatus, and share the power storage apparatuses among the plurality of customer facilities. By sharing the power storage apparatuses among the plurality of customer facilities, it is possible to achieve a sufficiently large total capacity even if each of the power storage apparatuses has a reduced capacity.

CITATION LIST

Patent Documents

PATENT DOCUMENT 1: Japanese Patent No. JP 6163040 B

SUMMARY OF INVENTION

Technical Problem

When transmitting and receiving power among a plurality of customer facilities and sharing power storage apparatuses among the plurality of customer facilities, in general, the number of charging and discharging cycles of each of the power storage apparatuses becomes larger than that of the case without transmitting and receiving power, and therefore, the power storage apparatuses are more likely to degrade.

For example, according to the invention of Patent Document 1, some of a plurality of power supply apparatuses provided at the facilities are selected to be suspended at predetermined intervals. This extends the lifetime of the power supply apparatuses of the facilities. However, in this case, tasks of the suspended power supply apparatuses (generating power, or charging and discharging power) should be done by the other power supply apparatuses. Accordingly, the number of charging and discharging cycles of each of the power storage apparatuses can not be reduced, and therefore, the power storage apparatuses are likely to degrade. In addition, losses may occur in paths for transmitting and receiving power.

An object of the present disclosure is to provide a power controller apparatus capable of controlling a plurality of customer facilities so that their power storage apparatuses are less likely to degrade, even when transmitting and receiving power among the plurality of customer facilities and sharing the power storage apparatuses among the plurality of customer facilities.

Another object of the present disclosure is to provide a power system including such a power controller apparatus and customer facilities.

Solution to Problem

A power controller apparatus according to an aspect of the present disclosure is provided for a power system including a plurality of customer facilities connected to each other via a power network connected to a power supply facility. The plurality of customer facilities are provided with load apparatuses, respectively, and at least two of the plurality of customer facilities are further provided with power storage apparatuses, respectively. The power controller apparatus is configured to predict demand power of each of the load apparatuses of the customer facilities for a unit time interval. The power controller apparatus is further configured to determine a reference capacity of each of the power storage apparatuses based on the demand power, the reference capacity indicating a capacity of each of the power storage apparatuses necessary to maintain power received by each of the customer facilities from the power supply facility at a first threshold or lower, under an assumption that power is not transmitted and received among the customer facilities. The power controller apparatus is further configured to determine an actual capacity of each of the power storage apparatuses based on the demand power, the actual capacity indicating a capacity of each of the power storage apparatuses necessary to maintain the power received by each of the customer facilities from the power supply facility at the first threshold or lower, under an assumption that power is transmitted and received among the customer facilities. The power controller apparatus is further configured to calculate a first characteristic value of each of the power storage apparatuses based on the demand power, the first characteristic value being associated with a degree of degradation of each of the power storage apparatuses for the unit time interval, under an assumption that power is not transmitted and received among the customer facilities, and that charging and discharging of each of the power storage apparatuses having the reference capacity are controlled so as to maintain the power received by each of the customer facilities from the power supply facility at the first threshold or lower. The power controller apparatus is further configured to calculate a second characteristic value of each of the power storage apparatuses based on the demand power, the second characteristic value being associated with the degree of degradation of each of the power storage apparatuses for the unit time interval, under an assumption that power is transmitted and received among the customer facilities, and that charging and discharging of each of the power storage apparatuses having the actual capacity are controlled so as to maintain the power received by each of the customer facilities from the power supply facility at the first threshold or lower, and determine a charging and discharging plan of the power storage apparatuses for the unit time interval so as to minimize an objective function indicating a degree of degradation from the first characteristic value to the second characteristic value. The power controller apparatus is further configured to control charging and discharging of each of the power storage apparatuses having the actual capacity in accordance with the charging and discharging plan.

Advantageous Effects of Invention

The power controller apparatus according to the present disclosure can control the plurality of customer facilities so that their power storage apparatuses are less likely to degrade, even when transmitting and receiving power among the plurality of customer facilities and sharing the power storage apparatuses among the plurality of customer facilities.

DESCRIPTION OF EMBODIMENTS

Hereinafter, embodiments of the present disclosure will be described with reference to the drawings.

First Embodiment

[Configuration of Power System]

Figure 1:
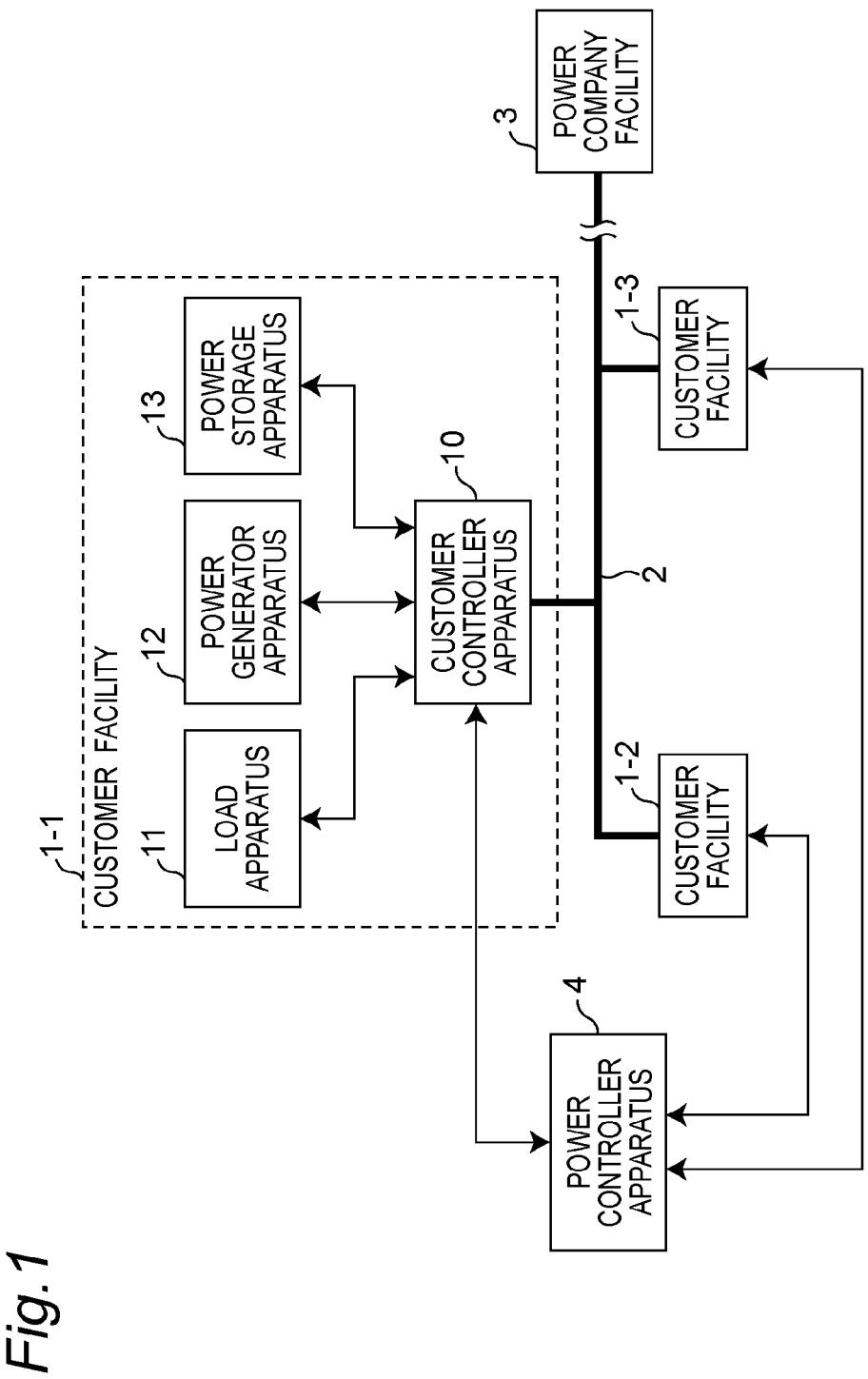
FIG. 1 is a block diagram of a configuration of a power system according to a first embodiment.

FIG. 1 is a block diagram of a configuration of a power system according to a first embodiment. The power system of FIG. 1 includes a plurality of customer facilities 1-1 to 1-3, a power network 2, a power company facility 3, and a power controller apparatus 4.

The plurality of customer facilities 1-1 to 1-3 are connected to each other via the power network 2, and further connected to the power company facility 3 via the power network 2.

The power company facility 3 is a power supply facility of a power company (such as power operator, system operator), including power plants, substations, a transmission network, a distribution network, and the like, from which the customer facilities 1-1 to 1-3 are supplied with commercial power (buy power) via the power network 2. A maximum (peak) of power received by each of the customer facilities 1-1 to 1-3 from the power company facility 3 is limited to a predetermined threshold or less by a contract between a customer and the power company. In the present specification, this threshold is also referred to as "peak reduction target power" or a "first threshold". In addition, in accordance with the contract between the customer and the power company, different electricity prices may be set for the power received by the customer facility 1-1 to 1-3 from the power company facility 3, depending on the time of day (for example, a nighttime electricity price may be lower than a daytime electricity price). In addition, in accordance with the contract between the customer and the power company, the customer facility 1-1 to 1-3 may supply power (sell power) to the power company facility 3.

The customer facility 1-1 is provided with a customer controller apparatus 10, a load apparatus 11, a power generator apparatus 12, and a power storage apparatus 13. The customer facility 1-1 is a home, a store, a factory, or the like, equipped with these components.

The load apparatus 11 includes various electrical appliances, and has demand power to be consumed by the electrical appliances.

The power generator apparatus 12 generates generated power by, for example, a renewable energy generator, such as a solar cell or a wind power generator.

The power storage apparatus 13 is charged with generated power generated by the power generator apparatus 12, commercial power supplied from the power company facility 3, or power transmitted from the other customer facilities 1-2 to 1-3.

The customer controller apparatus 10 monitors the demand power of the load apparatus 11, the generated power of the power generator apparatus 12, and a charged electric energy of the power storage apparatus 13 (that is, electric energy currently stored in the power storage apparatus 13), and notifies the power controller apparatus 4 of the monitored results. For example, the customer controller apparatus 10 may be integrated into a power distribution panel or a switch board, or may be electrically connected to the power distribution panel or the switch board.

The other customer facilities 1-2 to 1-3 are also configured in a manner similar to that of the customer facility 1-1. In the present specification, the customer facilities 1-1 to 1-3 are also collectively referred to as "customer facilities 1".

The same or different peak reduction target power may be set to the customer facilities 1. The same or different capacity may be set to the power storage apparatuses 13 of the customer facilities 1.

The customer facilities 1 transmit and receive power to and from each other. In order to simultaneously transmit power among a plurality of sets of customer facilities 1 via a common power line, the customer facilities 1 may modulate and transmit power by code modulation using modulation codes orthogonal to each other.

The power controller apparatus 4 controls charging and discharging of the power storage apparatuses 13 of the customer facilities 1, and further controls transmitting and receiving power among the customer facilities 1.

Figure 2:
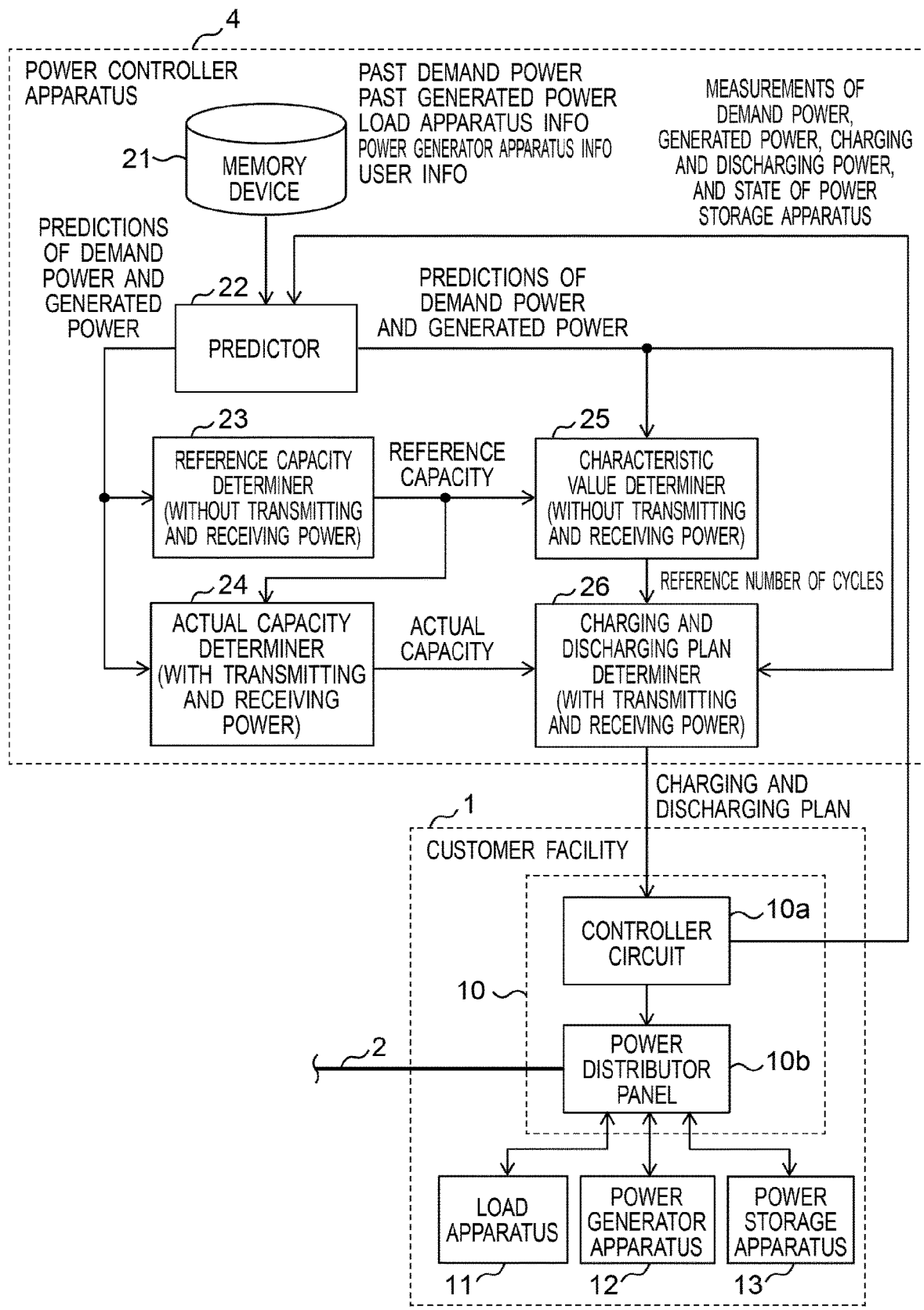
FIG. 2 is a block diagram of a configuration of a power controller apparatus 4 of FIG. 1.

FIG. 2 is a block diagram of a configuration of the power controller apparatus 4 of FIG. 1. The power controller apparatus 4 is provided with a memory device 21, a predictor 22, a reference capacity determiner 23, an actual capacity determiner 24, a characteristic value determiner 25, and a charging and discharging plan determiner 26.

The memory device 21 stores, for each customer facility 1, at least a part of past temporal variations in demand power, past temporal variations in generated power, information on the load apparatus 11, information on the power generator apparatus 12, and user information. The information on the load apparatus 11 includes, for example, rated power consumption of the load apparatus 11. The information on the power generator apparatus 12 includes, for example, rated output power of the power generator apparatus 12. The user information includes, for example, the number, ages, schedules (at home or absent), etc. of members of each customer facility 1. In addition, the memory device 21 may store weather information acquired from an external third-party server apparatus (not shown).

The predictor 22 predicts temporal variations in demand power of the load apparatus 11 and generated power of the power generator apparatus 12 of each customer facility 1 for a time interval of a predetermined length from the current time to a future time (in the present specification, referred to as a "unit time interval"), based on the information stored in the memory device 21. The length of the unit time interval may be, for example, several hours, 24 hours, several days, or the like.

The reference capacity determiner 23 determines a capacity of each power storage apparatus 13 based on the predicted temporal variations in demand power and generated power, the capacity being necessary to maintain the power received by each customer facility 1 from the power company facility 3 at the peak reduction target power or lower, under an assumption that power is not transmitted and received among the customer facilities 1. In the present specification, this capacity is referred to as a "reference capacity". The reference capacity may be set to a minimum capacity satisfying the above-mentioned conditions.

The actual capacity determiner 24 determines a capacity of each power storage apparatus 13 based on the predicted temporal variations in demand power and generated power, the capacity being necessary to maintain the power received by each customer facility 1 from the power company facility 3 at the peak reduction target power or lower, under an assumption that power is transmitted and received among the customer facilities 1. In the present specification, this capacity is referred to as an "actual capacity". The actual capacity may be set to a minimum capacity satisfying the above-mentioned conditions.

When power is transmitted and received among the customer facilities 1, the customer facilities 1 share a plurality of the power storage apparatuses 13, and therefore, the actual capacity is smaller than the reference capacity. The customer facilities 1 are provided with the power storage apparatuses 13 having the actual capacities, respectively.

The characteristic value determiner 25 determines a charging and discharging plan for controlling charging and discharging of the power storage apparatuses 13, under an assumption that power is not transmitted and received among the customer facilities 1 and that each power storage apparatus 13 has the reference capacity. Specifically, under this assumption, the characteristic value determiner 25 determines the charging and discharging plan of each power storage apparatus 13 for the unit time interval based on the predicted temporal variations in demand power and generated power, so as to maintain the power received by each customer facility 1 from the power company facility 3 at the peak reduction target power or lower. The characteristic value determiner 25 calculates a characteristic value associated with a degree of degradation of each power storage apparatus 13 for the unit time interval, under an assumption that charging and discharging of the power storage apparatus 13 having the reference capacity are controlled in accordance with this charging and discharging plan. The characteristic value is, for example, the number of charging and discharging cycles of each power storage apparatus 13 for the unit time interval. An increase in the number of charging and discharging cycles represents degradation of the power storage apparatus 13. In the present specification, the number of charging and discharging cycles determined by the characteristic value determiner 25 is also referred to as a "reference number of cycles" or a "first characteristic value".

The charging and discharging plan determiner 26 determines a charging and discharging plan for controlling charging and discharging of the power storage apparatuses 13, under an assumption that power is transmitted and received among the customer facilities 1 and that each power storage apparatus 13 has the actual capacity. Specifically, under this assumption, the charging and discharging plan determiner 26 determines a charging and discharging plan of the power storage apparatuses 13 for the unit time interval based on the predicted temporal variations in demand power and generated power, so as to maintain the power received by each customer facility 1 from the power company facility 3 at the peak reduction target power or lower. The charging and discharging plan determined by the charging and discharging plan determiner 26 includes temporal variations in charging power and discharging power of each power storage apparatus 13 for the unit time interval, and further includes temporal variations in transmitting power and receiving power among the customer facilities 1. The charging and discharging plan determiner 26 calculates a characteristic value associated with the degree of degradation of each power storage apparatus 13 for the unit time interval, that is, the number of charging and discharging cycles of each power storage apparatus 13 for the unit time interval, under an assumption that charging and discharging of the power storage apparatuses 13 having the actual capacities are controlled in accordance with this charging and discharging plan. In the present specification, the number of charging and discharging cycles determined by the charging and discharging plan determiner 26 is also referred to as an "actual number of cycles" or a "second characteristic value". The charging and discharging plan determiner 26 calculates an objective function f indicating a degree of degradation from the reference number of cycles to the actual number of cycles, and determines a charging and discharging plan of the power storage apparatuses 13 having the actual capacities for the unit time interval so as to minimize the value of the objective function f. An increase in the number of charging and discharging cycles represents degradation from the reference number of cycles to the actual number of cycles.

The customer controller apparatus 10 is provided with a control circuit 10a and a power distribution panel 10b. The control circuit 10a controls the power distribution panel 10b under control of the power controller apparatus 4. The power distribution panel 10b is connected to the power company facility 3 via the power network 2, and transmits and receives power to and from the power company facility 3, the load apparatus 11, the power generator apparatus 12, and the power storage apparatus 13.

In the present specification, the number of charging and discharging cycles of a certain power storage apparatus 13 is calculated by dividing the sum of an absolute value of charging electric energy and an absolute value of discharging electric energy for the unit time interval, by the capacity of the power storage apparatus 13 (that is, the reference capacity or the actual capacity).

For example, the objective function f is given as follows.

$$f = \sum_{i=1}^{N} A_i \times \max(Cb_i - Ca_i, 0) + B_i \qquad \text{[Mathematical Expression 1]}$$

Where $A_i$ indicates a predetermined weight coefficient of the customer facility 1-i (i=1 to 3), which is set depending on, for example, a unit price of electricity. For example, when the customer facility 1-i is a typical home in Japan, and the electricity price is expressed in Japanese yen, the weight coefficient $A_i$ may be set to, e.g., 0.01. $Ca_i$ indicates the reference number of cycles of the customer facility 1-i, and $Cb_i$ indicates the actual number of cycles of the customer facility 1-i. "$Cb_i - Ca_i$" indicates a penalty imposed when the actual number of cycles $Cb_i$ degrades (that is, increases) from the reference number of cycles $Ca_i$. $B_i$ indicates an electricity price determined according to the power received by the customer facility 1-i from the power company facility 3. When the customer facility 1-i sells power to the power company facility 3, the electricity price may be reduced according to the selling power.

The value of the objective function f increases with an increase from the reference number of cycles to the actual number of cycles. In other words, when power is transmitted and received among the customer facilities 1, and the capacity of each power storage apparatus 13 is reduced below the reference capacity, the number of charging and discharging cycles increases as compared to the case where power is not transmitted and received among the customer facilities 1, and each power storage apparatus 13 has the reference capacity. In this case, the value of the objective function f increases with the increase in the number of charging and discharging cycles. In addition, the higher the electricity price is, the larger the value of the objective function f is.

The power control apparatus 4 controls charging and discharging of the power storage apparatuses 13 of the customer facilities 1, and further controls transmitting and receiving power among the customer facilities 1, in accordance with the charging and discharging plan determined by the charging and discharging plan determiner 26.

The power controller apparatus 4 may be implemented as hardware components 21 to 26, or may be implemented as a program that provides the same functions as the components 21 to 26 when executed by a processor.

[Power Control Process]

Hereinafter, operation of the power controller apparatus 4 will be described in more detail with reference to FIGS. 3 to 16.

Figure 3:
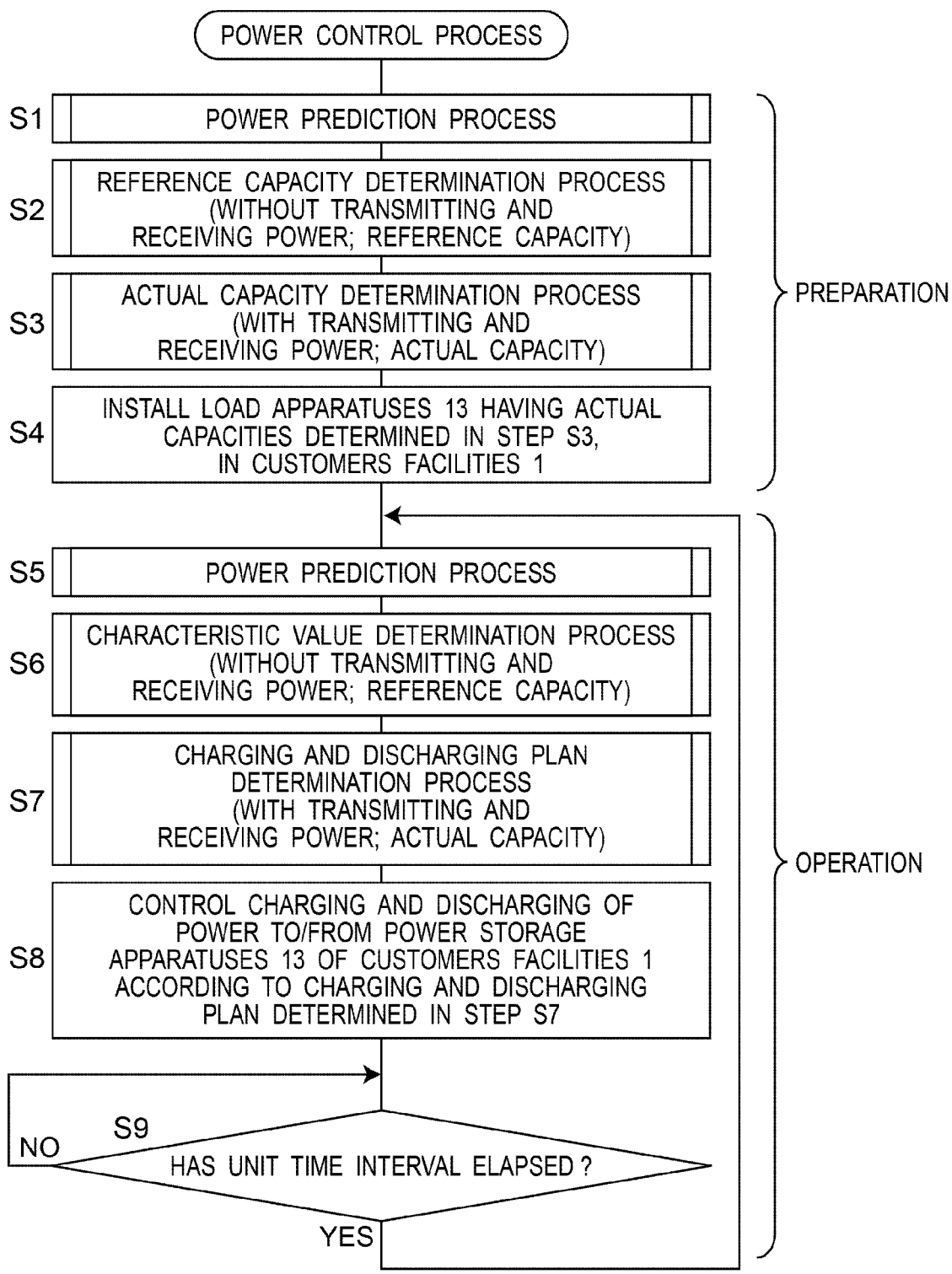
FIG. 3 is a flowchart showing a first power control process executed by the power controller apparatus 4 of FIG. 1.

FIG. 3 is a flowchart showing a first power control process executed by the power controller apparatus 4 of FIG. 1.

In step S1, the predictor 22 executes power prediction process. In this step, the predictor 22 predicts temporal variations in demand power and generated power of each customer facility 1 for the unit time interval. In step S2, the reference capacity determiner 23 executes reference capacity determination process. In this step, the reference capacity determiner 23 determines the reference capacity of each power storage apparatus 13 under an assumption that power is not transmitted and received among the customer facilities 1. In step S3, the actual capacity determiner 24 executes actual capacity determination process. In this step, the actual capacity determiner 24 determines the actual capacity of each power storage apparatus 13 under an assumption that power is transmitted and received among the customer facilities 1.

Steps S1 to S3 are preparatory processes for determining the capacity of each power storage apparatus 13 of the customer facilities 1, to be executed before installing the power storage apparatuses 13 in the customer facilities 1 (that is, before actual operation of the customer facilities 1). In step S4, the power storage apparatuses 13 having the actual capacities determined in step S3 are installed in the customer facilities 1.

In step S5, the predictor 22 executes the power prediction process. In this step, the predictor 22 predicts temporal variations in demand power and generated power of each customer facility 1 for the unit time interval. In step S6, the characteristic value determiner 25 executes characteristic value determination process. In this step, the characteristic value determiner 25 determines a charging and discharging plan of each power storage apparatus 13 for the unit time interval, under an assumption that power is not transmitted and received among the customer facilities 1 and that each power storage apparatus 13 has the reference capacity, and calculates the reference number of cycles when charging and discharging of each power storage apparatus 13 are controlled in accordance with this charging and discharging plan. In step S7, the charging and discharging plan determiner 26 executes charging and discharging plan determination process. In this step, the charging and discharging plan determiner 26 calculates the actual number of cycles when charging and discharging of the power storage apparatuses 13 are controlled under an assumption that power is transmitted and received among the customer facilities 1 and that each power storage apparatus 13 has the actual capacity, and determines a charging and discharging plan of the power storage apparatuses 13 for the unit time interval so as to minimize the value of the objective function f. In step S8, the power controller apparatus 4 controls charging and discharging of the power storage apparatuses 13 of the customer facilities 1 in accordance with the charging and discharging plan determined in step S7. In step S9, when the unit time interval has elapsed, the process returns to step S5, and repeats from steps S5 to S9.

Steps S5 to S9 are operational processes in which the customer facilities 1 are actually operated to control consuming, transmitting, receiving, charging, and discharging power in the customer facilities 1.

[Power Prediction Process]

Figure 4:
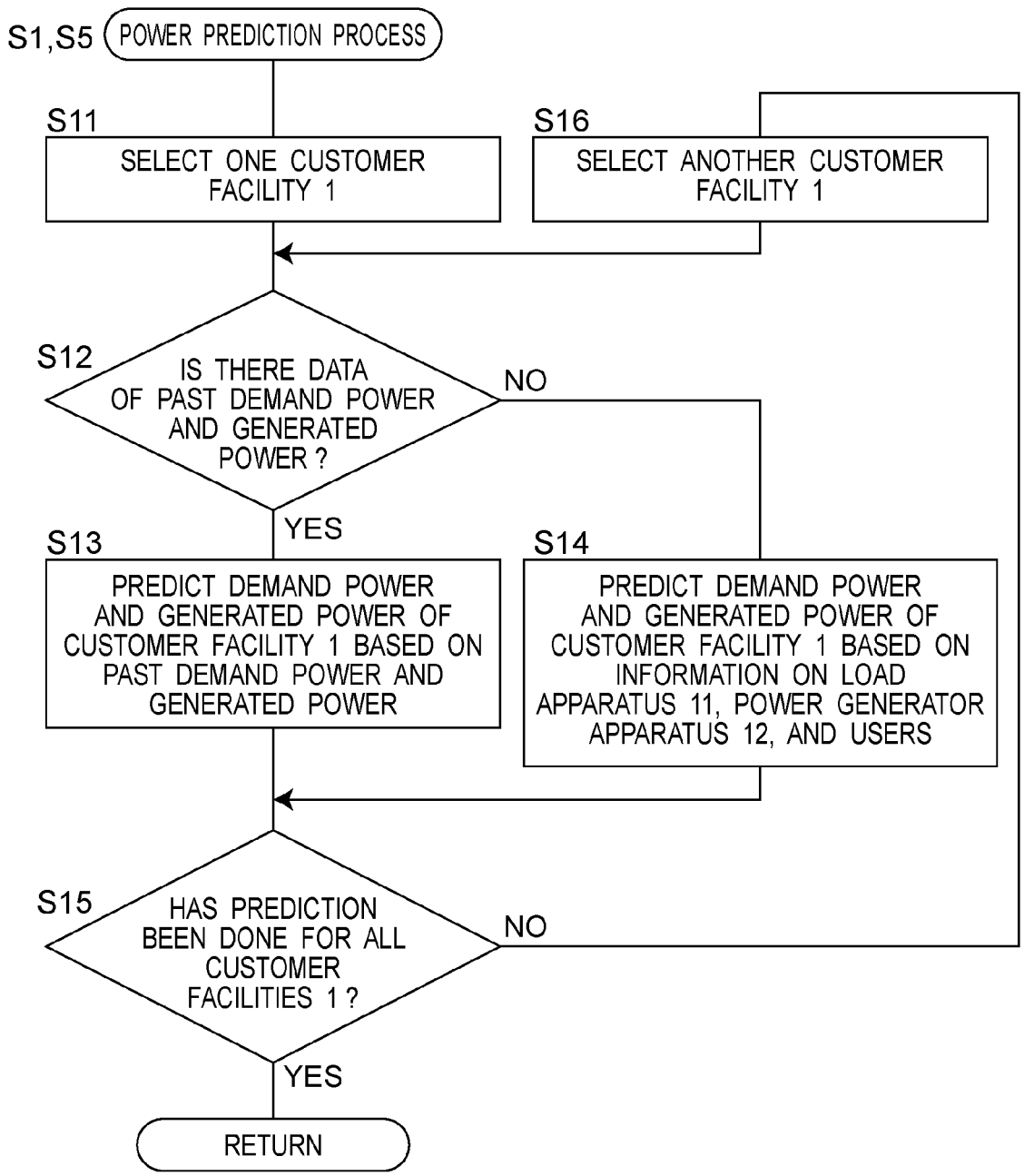
FIG. 4 is a subroutine showing a power prediction process of steps S1, S5 in FIG. 3.

FIG. 4 is a subroutine showing the power prediction process of steps S1 and S5 in FIG. 3.

In step S11 of FIG. 4, the predictor 22 selects one customer facility 1. In step S12, the predictor 22 determines whether or not there is data on past demand power and past generated power of the selected customer facility 1 in the memory device 21; if YES, the process proceeds to step S13, and if NO, the process proceeds to step S14. In step S13, the predictor 22 predicts temporal variations in demand power and generated power of the customer facility 1 for the unit time interval, based on the past temporal variations in demand power and generated power of the customer facility 1. In step S14, the predictor 22 predicts temporal variations in demand power and generated power of the customer facility 1 for the unit time interval, based on the information on the load apparatus 11, the power generator apparatus 12, and the users stored in the memory device 21. In step S15, the predictor 22 determines whether or not the prediction of demand power and generated power has been done for all the customer facilities 1; if YES, the process proceeds to step S2 of FIG. 3, and if NO, the process proceeds to step S16 of FIG. 4. In step S16, the predictor 22 selects another customer facility 1, and then repeats steps S12 to S15.

In step S13, the predictor 22 may predict temporal variations in demand power and generated power of the customer facility 1 for the unit time interval, by referring to the information on the load apparatus 11, the power generator apparatus 12, and the users, in addition to the past temporal variations in demand power and generated power of the customer facility 1.

In step S1, the predictor 22 may use the data on demand power and generated power of each customer facility 1 over a past long period (for example, one year to several years), in order to appropriately determine the capacity (actual capacity) of each power storage apparatus 13. For example, the predictor 22 may extract and average demand power at the same time on every day from the demand power over the past long period, thus generating a set of averages of the demand power per time of day. In addition, the predictor 22 may extract a maximum of demand power at the same time on every day from the demand power over the past long period, thus generating a set of maximums of the demand power per time of day. The set of the demand power generated in such manners represents predicted temporal variations in demand power. In addition, the predictor 22 may extract and average generated power at the same time on every day from the generated power over the past long period, thus generating a set of averages of the generated power per time of day. In addition, the predictor 22 may extract a minimum of generated power at the same time on every day from the generated power over the past long period, thus generating a set of minimums of the generated power per time of day. The set of the generated power generated in such manners represents predicted temporal variations in generated power.

In addition, in step S1, the predictor 22 may use weather information over a past long period, such as, for example, an average, maximum, or minimum of weather (for example, duration of sunshine) and/or temperature, per time of day, in order to predict the temporal variations in demand power and generated power.

On the other hand, in step S5, the predictor 22 may use data on demand power and generated power of the same day of week or the same date as when step S5 is being executed, from the data on past demand power and past generated power of each customer facility 1, in order to appropriately determine the charging and discharging plan.

In addition, in step S5, the predictor 22 may use current weather information, and/or weather forecasts over a short-term future (for example, several hours to 24 hours), in order to predict the temporal variations in demand power and generated power.

[Reference Capacity Determination Process (Step S2)]

Figure 5:
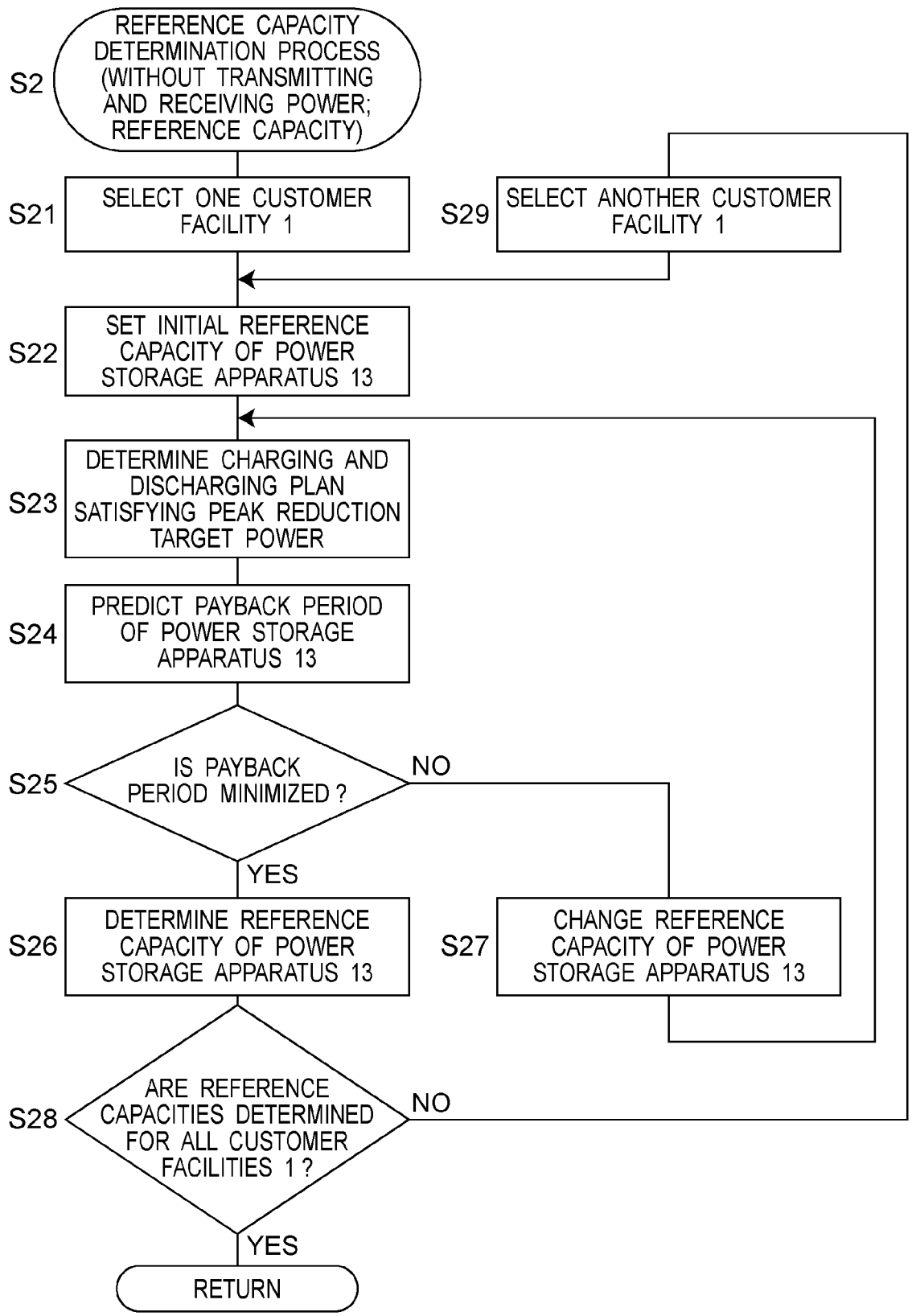
FIG. 5 is a subroutine showing a reference capacity determination process of step S2 in FIG. 3.

FIG. 5 is a subroutine showing the reference capacity determination process of step S2 in FIG. 3.

In step S21 of FIG. 5, the reference capacity determiner 23 selects one customer facility 1. In step S22, the reference capacity determiner 23 sets an initial reference capacity for the power storage apparatus 13 of the selected customer facility 1. In step S23, the reference capacity determiner 23 determines a charging and discharging plan of the power storage apparatus 13, under an assumption that power is not transmitted and received among the customer facilities 1 and that the power storage apparatus 13 has the reference capacity currently set. Specifically, under this assumption, the reference capacity determiner 23 determines a charging and discharging plan of the power storage apparatus 13 for the unit time interval based on the temporal variations in demand power and generated power predicted in step S1, so as to maintain the power received by the selected customer facility 1 from the power company facility 3 at the peak reduction target power or lower.

Figure 9:
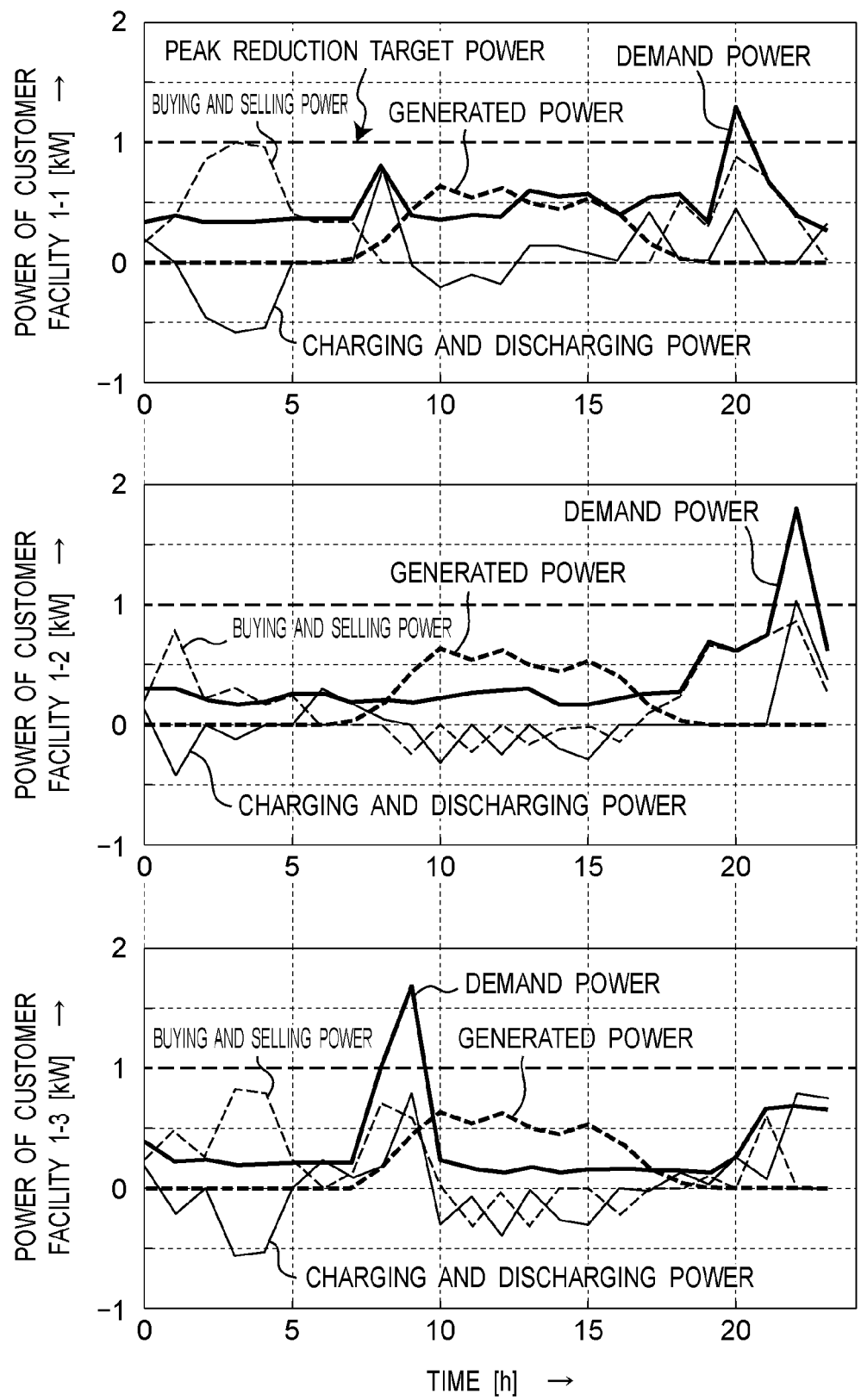
FIG. 9 is a set of graphs showing exemplary temporal variations in demand power, buying and selling power, generated power, and charging and discharging power of each of the customer facilities 1 of FIG. 1, in a case without transmitting and receiving power among the customer facilities 1.

FIG. 9 is a set of graphs showing exemplary temporal variations in demand power, buying and selling power, generated power, and charging and discharging power of each of the customer facilities 1 of FIG. 1, in a case without transmitting and receiving power among the customer facilities 1.

The customer facilities 1-1 to 1-3 have the demand power different from each other. Referring to each graph of FIG. 9 (and FIGS. 12, 14, 17, and 18), in plots of the buying and selling power, positive power indicates buying power, and negative power indicates selling power. In addition, referring to each graph of FIG. 9 (and FIGS. 12, 14, 17, and 18), in plots of the charging and discharging power, positive power indicates discharging power, and negative power indicates charging power. The power generator apparatuses 12 of the customer facilities 1-1 to 1-3 are solar cells operating under the same weather conditions (that is, installed at locations close to each other), and their temporal variations in generated power are assumed to be the same with each other. The customers have their respective contracts with the power company for the same unit prices of electricity (for example, 25 yen/kWh from 6:00 to 25:00 (1:00); 17 yen/kWh from 1:00 to 6:00). The peak reduction target power of 1 kW is set for each of the customer facilities 1-1 to 1-3 by the contracts between the customers and the power company. In addition, in each graph of FIG. 9 (and FIGS. 12, 14, 17, and 18), the unit time interval is 24 hours.

Referring to the top of FIG. 9, from 1:00 to 5:00, the customer facility 1-1 buys power from the power company facility 3 and charges the power storage apparatus 13 in advance, in order to cope with the increase in the demand power and the like predicted to occur at a later time. From 7:00 to 9:00, the customer facility 1-1 discharges the power storage apparatus 13 according to the increase in the demand power, and consumes the discharged power by the load apparatus 11. From 9:00 to 12:00, the generated power exceeds the demand power, and the customer facility 1-1 charges the power storage apparatus 13 with the excess of the generated power. From 16:00 to 18:00, the customer facility 1-1 discharges the power storage apparatus 13 in order to compensate for the decrease in the generated power, and consumes the discharged power by the load apparatus 11. Around 20:00, the demand power increases beyond the peak reduction target power. From 19:00 to 21:00, the customer facility 1-1 discharges the power storage apparatus 13 according to the increase in the demand power, and consumes the discharged power by the load apparatus 11.

Referring to the middle of FIG. 9, from 0:00 to 2:00, the customer facility 1-2 buys power from the power company facility 3 and charges the power storage apparatus 13. From 5:00 to 8:00, the customer facility 1-2 reduces the buying power, discharges the power storage apparatus 13, and consumes the discharged power by the load apparatus 11, in advance, in order to cope with the increase in the generated power predicted to occur at a later time. From 8:00 to 17:00, the generated power exceeds the demand power, and the customer facility 1-2 charges the power storage apparatus 13 with the excess of the generated power, and further sells the excess of the generated power to the power company facility 3. From 21:00 to 23:00, the demand power increases beyond the peak reduction target power, and the customer facility 1-2 discharges the power storage apparatus 13 according to the increase in the demand power, and consumes the discharged power by the load apparatus 11.

Referring to the bottom of FIG. 9, from 0:00 to 5:00, the customer facility 1-3 buys power from the power company facility 3 and charges the power storage apparatus 13, in order to cope with the increase in the demand power and the like predicted to occur at a later time. From 8:00 to 10:00, the demand power increases beyond the peak reduction target power, and the customer facility 1-3 discharges the power storage apparatus 13 according to the increase in the demand power, and consumes the discharged power by the load apparatus 11. From 10:00 to 17:00, the generated power exceeds the demand power, and the customer facility 1-3 charges the power storage apparatus 13 with the excess of the generated power, and further sells the excess of the generated power to the power company facility 3. From 21:00 to 24:00, the customer facility 1-3 reduces the buying power, discharges the power storage apparatus 13, and consumes the discharged power by the load apparatus 11.

When the temporal variations in demand power and generated power of each customer facility 1 are predicted, for example, as shown in FIG. 9, the charging and discharging plans of the power storage apparatuses 13 of the customer facilities 1 in the case without transmitting and receiving power among the customer facilities 1 are determined, for example, as shown by the plots of the charging and discharging power of FIG. 9.

Figure 10:
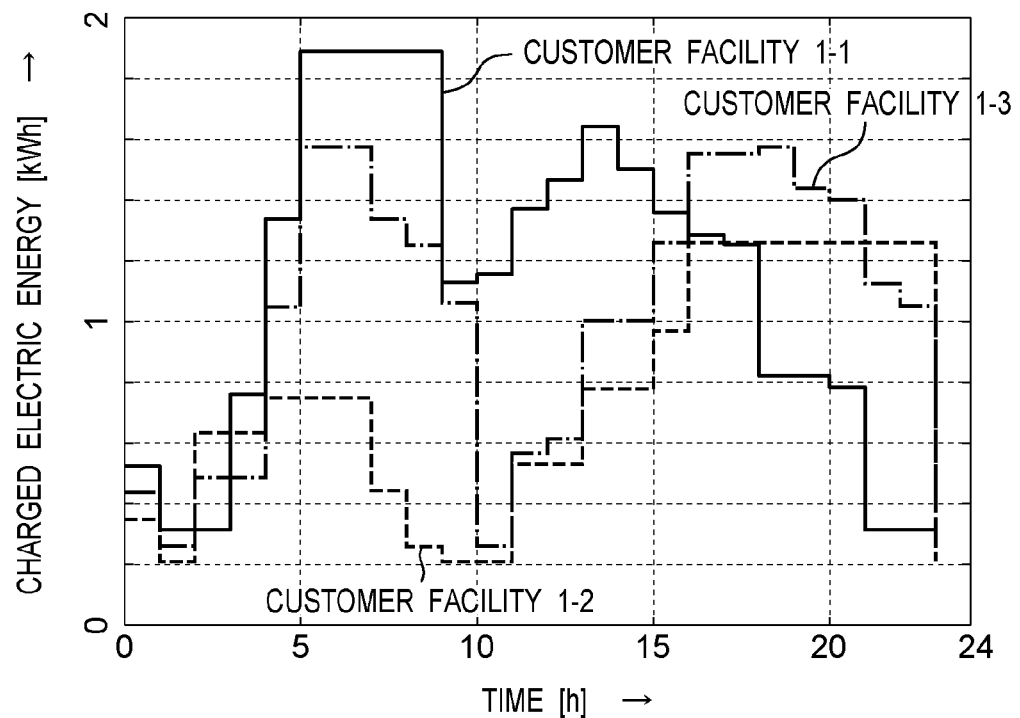
FIG. 10 is a graph showing exemplary temporal variations in charged electric energy of each of power storage apparatuses 13 of the customer facilities 1 of FIG. 1, in the case without transmitting and receiving power among the customer facilities 1.

FIG. 10 is a graph showing exemplary temporal variations in charged electric energy of each of the power storage apparatuses 13 of the customer facilities 1 of FIG. 1, in the case without transmitting and receiving power among the customer facilities 1. FIG. 10 shows the temporal variations in charged electric energy when the charging and discharging power of each customer facility 1 varies as shown in FIG. 9. Assume that the reference capacities of 2.1 kWh, 1.4 kWh, and 1.8 kWh are set for the power storage apparatuses 13 of the customer facilities 1-1, 1-2, and 1-3, respectively. The number of charging and discharging cycles of each of the power storage apparatuses 13 of the customer facilities 1 is calculated based on the reference capacity of the power storage apparatus 13, and based on the increase and decrease in the charged electric energy of the power storage apparatus 13 (that is, charging electric energy and discharging electric energy) as shown in FIG. 10. In the example of FIG. 10, the power storage apparatuses 13 of the customer facilities 1-1, 1-2, and 1-3 have the numbers of charging and discharging cycles of 2.1, 2.4, and 3.1, respectively.

In step S24 of FIG. 5, the reference capacity determiner 23 predicts a payback period of the power storage apparatus 13. For this purpose, the reference capacity determiner 23 calculates a first electricity price in a case where the contract between the customer and the power company allows the customer facility 1 to receive peak demand power from the power company facility 3. In addition, the reference capacity determiner 23 calculates a second electricity price in a case where the contract between the customer and the power company allows the customer facility 1 to receive power up to the peak reduction target power from the power company facility 3. In this cases, the first and second electricity prices are expressed, for example, in units of [yen/month] or [yen/year]. The difference between the first and second electricity prices is a reduction in electricity price achieved by using the power storage apparatus 13. The payback period is calculated by dividing a price of the power storage apparatus 13 by the reduction in electricity price achieved by using the power storage apparatus 13.

Figure 11:
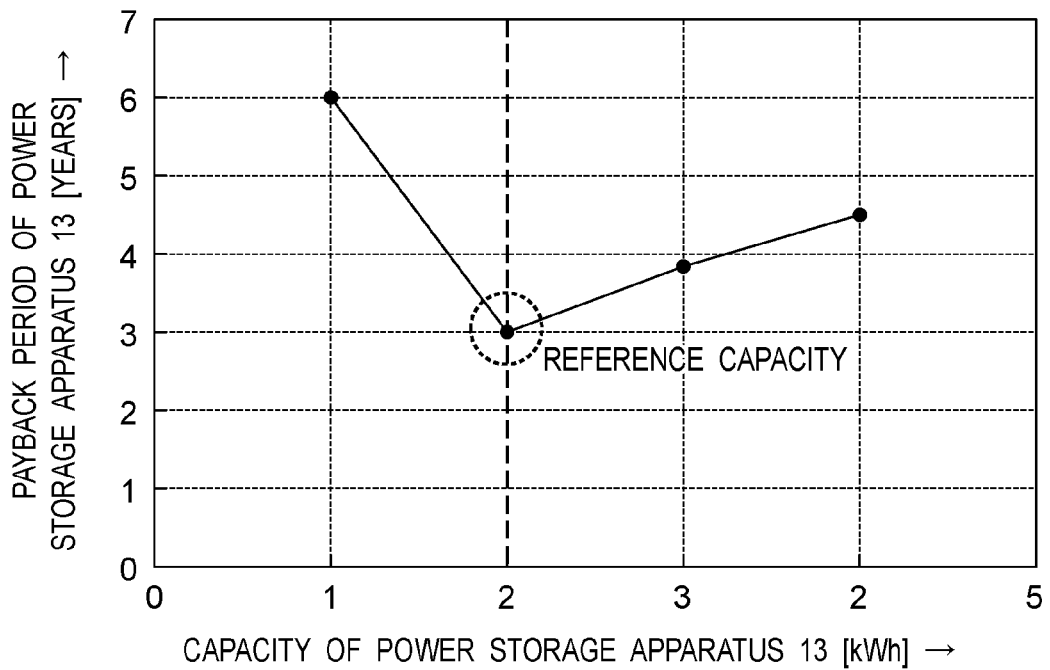
FIG. 11 is a graph for explaining determination of a reference capacity of the power storage apparatus 13 in step S2 of FIG. 3.

FIG. 11 is a graph for explaining the determination of the reference capacity of the power storage apparatus 13 in step S2 of FIG. 3. The larger the capacity of the power storage apparatus 13 is, the lower the peak reduction target power can be. However, the larger the capacity of the power storage apparatus 13 is, the higher the price of the power storage apparatus 13 is, and therefore, the longer the payback period is. On the other hand, the smaller the capacity of the power storage apparatus 13 is, the lower the price of the power storage apparatus 13 is. However, the smaller the capacity of the power storage apparatus 13 is, the more difficult it is to reduce the peak reduction target power, and therefore, the longer the payback period is. Therefore, the reference capacity of the power storage apparatus 13 is determined so as to minimize the payback period.

In step S25 of FIG. 5, the reference capacity determiner 23 determines whether or not the payback period is minimized; if YES, the process proceeds to step S26, and if NO, the process proceeds to step S27. In step S26, the reference capacity determiner 23 determines the reference capacity currently set, as the reference capacity of the power storage apparatus 13. In step S27, the reference capacity determiner 23 changes the reference capacity of the power storage apparatus 13. The reference capacity determiner 23 may change the reference capacity of the power storage apparatus 13, for example, by a predetermined step size, or by a variable step size using a steepest gradient method or the like. The step size may be expressed as capacity, or as a ratio to the reference capacity currently set.

In step S28, the reference capacity determiner 23 determines whether or not the reference capacities are determined for all the customer facilities 1; if YES, the process proceeds to step S3 of FIG. 3, and if NO, the process proceeds to step S29 of FIG. 5. In step S29, the reference capacity determiner 23 selects another customer facility 1, and repeats steps S22 to S28.

By executing the reference capacity determination process of step S2 in such a manner, it is possible to determine the reference capacity sufficient to maintain the power received by each customer facility 1 from the power company facility 3 at the peak reduction target power or lower, under the assumption that power is not transmitted and received among the customer facilities 1.

The reference capacity determiner 23 may determine the reference capacities for the customer facilities 1, respectively, as shown in FIG. 5. Alternatively, the reference capacity determiner 23 may determine one reference capacity common to the customer facilities 1.

[Actual Capacity Determination Process (Step S3)]

Figure 6:
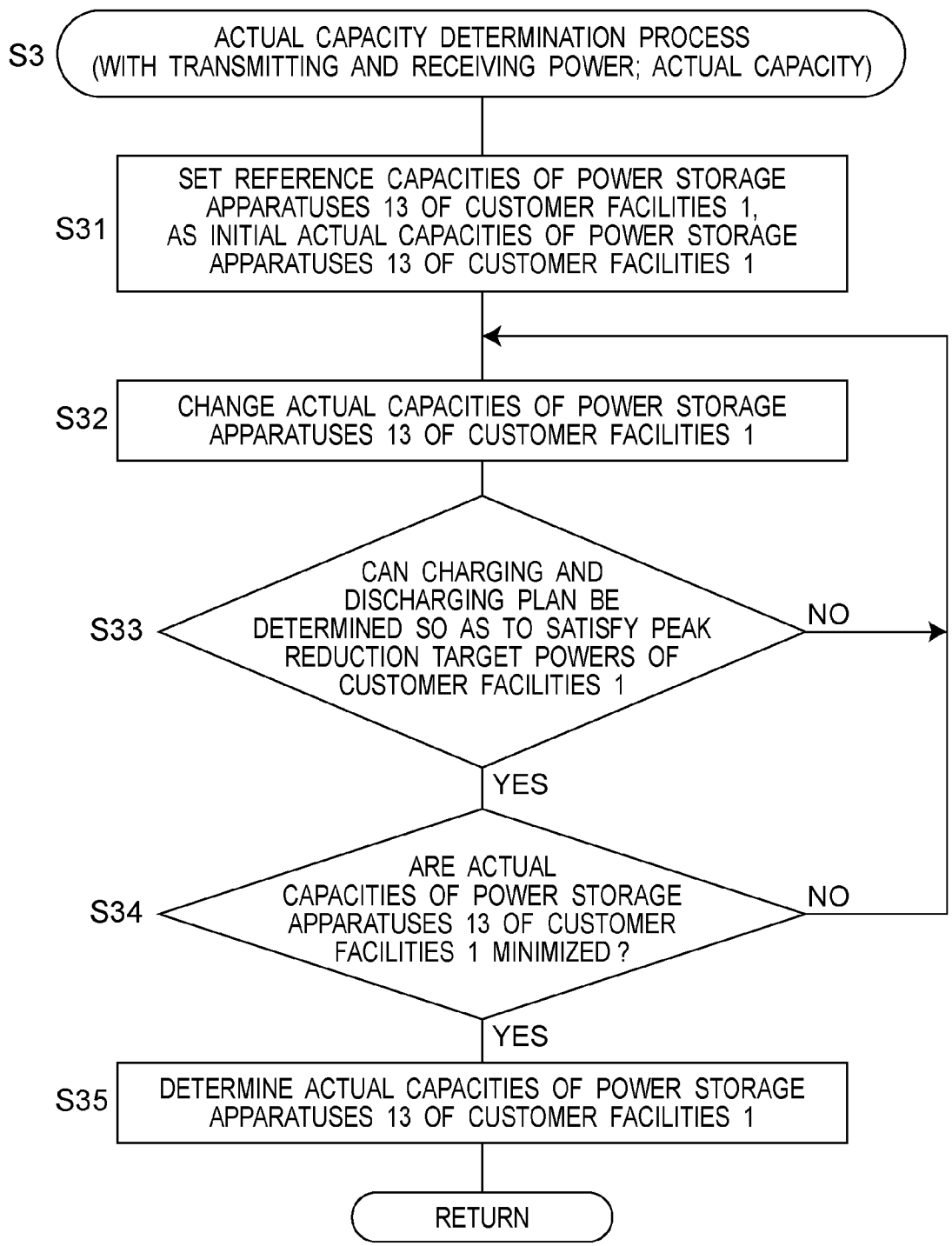
FIG. 6 is a subroutine showing an actual capacity determination process of step S3 in FIG. 3.

FIG. 6 is a subroutine showing the actual capacity determination process of step S3 in FIG. 3.

In step S31 of FIG. 6, the actual capacity determiner 24 sets the reference capacities of the power storage apparatuses 13 of the customer facilities 1 determined in step S2 of FIG. 3, as initial actual capacities of the power storage apparatuses 13 of the customer facilities 1.

In step S32, the actual capacity determiner 24 changes the actual capacities of the power storage apparatuses 13 of the customer facilities 1. The actual capacity determiner 24 may change the actual capacities of the power storage apparatuses 13, for example, by a predetermined step size, or by a variable step size using a steepest gradient method or the like. The step size may be expressed as capacity, or as a ratio to the actual capacity currently set. The same or different step size may be set to the customer facilities 1.

In step S33, the actual capacity determiner 24 tries to determine a charging and discharging plan of the power storage apparatuses 13, under an assumption that power is transmitted and received among the customer facilities 1 and that each power storage apparatus 13 has the actual capacity currently set. Specifically, under this assumption, the actual capacity determiner 24 tries to determine the charging and discharging plan of the power storage apparatuses 13 for the unit time interval based on the temporal variations in demand power and generated power predicted in step S1, so as to maintain the power received by each customer facility 1 from the power company facility 3 at the peak reduction target power or lower.

Figure 12:
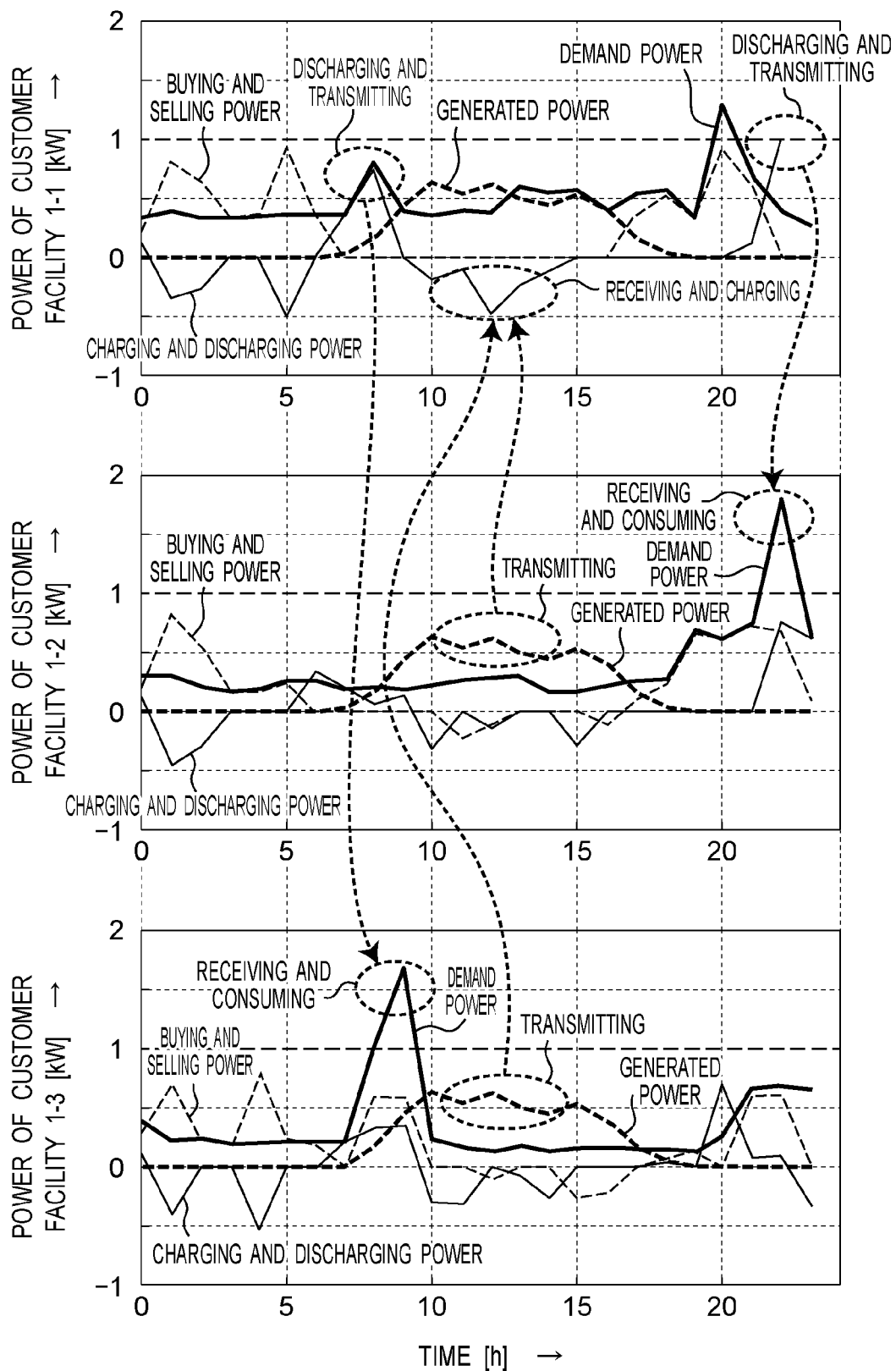
FIG. 12 is a set of graphs showing exemplary temporal variations in demand power, buying and selling power, generated power, and charging and discharging power of each of the customer facilities 1 of FIG. 1, in a case with transmitting and receiving power among the customer facilities 1 and without constraints on charging and discharging of the power storage apparatuses 13.

FIG. 12 is a set of graphs showing exemplary temporal variations in demand power, buying and selling power, generated power, and charging and discharging power of each of the customer facilities 1 of FIG. 1, in a case with transmitting and receiving power among the customer facilities 1 and without constraints on charging and discharging of the power storage apparatuses 13.

In this case, the term "constraints on charging and discharging power" means that charging and discharging of the power storage apparatuses 13 are controlled so as to reduce the characteristic value associated with the degree of degradation of each power storage apparatus 13, that is, an increase in the number of charging and discharging cycles, as small as possible, with respect to the case without transmitting and receiving power among the customer facilities 1.

The demand power and the generated power of each of the customer facilities 1-1 to 1-3 in FIG. 12 are the same as those shown in FIG. 9.

Referring to the top, middle, and bottom of FIG. 12, from 0:00 to 5:00, each of the customer facilities 1-1 to 1-3 buys power from the power company facility 3 and charges the power storage apparatus 13, in a manner similar to that of FIG. 9. However, in the case of FIG. 12, since power may be transmitted and received among the customer facilities 1-1 to 1-3, the buying power and the charging power from 0:00 to 5:00 are higher or lower than those of FIG. 9.

In addition, as explained with reference to FIG. 9, from 8:00 to 10:00, the demand power of the customer facility 1-3 increases beyond the peak reduction target power, the customer facility 1-3 discharges the power storage apparatus 13, and consumes the discharged power by the load apparatus 11. Therefore, as shown in FIG. 10, the charged electric energy of the power storage apparatus 13 of the customer facility 1-3 becomes close to zero around 10:00. On the other hand, in the case of FIG. 12, from 6:00 to 9:00, the customer facility 1-1 transmits a part of the discharging power of the power storage apparatus 13 to the customer facility 1-3, and the load apparatus 11 of the customer facility 1-3 consumes the power received from the customer facility 1-1. As a result, in the case of FIG. 12, the discharging power of the power storage apparatus 13 of the customer facility 1-1 from 6:00 to 9:00 is higher than that of FIG. 9, and thus, the increase in the number of charging and discharging cycles of the power storage apparatus 13 of the customer facility 1-1 becomes larger than that of FIG. 9.

In addition, as explained with reference to FIG. 9, in the customer facility 1-2, the generated power exceeds the demand power from 8:00 to 17:00, and in the customer facility 1-3, the generated power exceeds the demand power from 10:00 to 17:00. Then in the case of FIG. 9, each of the customer facilities 1-2, 1-3 charges the power storage apparatus 13 with the excess of the generated power, and further sells the excess of the generated power to the power company facility 3. On the other hand, in the case of FIG. 12, from 9:00 to 15:00, each of the customer facilities 1-2, 1-3 transmits the excess of the generated power to the customer facility 1-1, instead of selling the power to the power company facility 3, and the customer facility 1-1 charges the power storage apparatus 13 with the power received from each of the customer facilities 1-2, 1-3. As a result, in the case of FIG. 12, the charging power of the power storage apparatus 13 of the customer facility 1-1 from 9:00 to 15:00 is higher than that of FIG. 9, and thus, the increase in the number of charging and discharging cycles of the power storage apparatus 13 of the customer facility 1-1 becomes larger than that of FIG. 9. In addition, in the case of FIG. 12, since the selling power is reduced, it is possible to reduce influence on the power company facility 3 as compared to the case of FIG. 9.

In addition, as explained with reference to FIG. 9, from 21:00 to 23:00, the demand power of the customer facility 1-2 increases beyond the peak reduction target power, and the customer facility 1-2 discharges the power storage apparatus 13, and consumes the discharged power by the load apparatus 11. Therefore, as shown in FIG. 10, the charged electric energy of the power storage apparatus 13 of the customer facility 1-2 becomes close to zero around 24:00. On the other hand, in the case of FIG. 12, the power storage apparatus 13 of the customer facility 1-1 is charged with the power received from each of the customer facilities 1-2, 1-3 from 9:00 to 15:00 as described above, and thus, has higher charged electric energy from 21:00 to 23:00 than that of FIG. 9. Accordingly, in the case of FIG. 12, from 21:00 to 23:00, the customer facility 1-1 transmits a part of the discharging power of the power storage apparatus 13 to the customer facility 1-2, and the load apparatus 11 of the customer facility 1-2 consumes the power received from the customer facility 1-1. As a result, in the case of FIG. 12, the discharging power of the power storage apparatus 13 of the customer facility 1-1 from 21:00 to 23:00 is higher than that of FIG. 9, and thus, the increase in the number of charging and discharging cycles of the power storage apparatus 13 of the customer facility 1-1 becomes larger than that of FIG. 9.

When the temporal variations in demand power and generated power of each customer facility 1 are predicted, for example, as shown in FIG. 12, the charging and discharging plan of the power storage apparatuses 13 of the customer facilities 1 in the case with transmitting and receiving power among the customer facilities 1 are determined, for example, as shown by the plots of the charging and discharging power of FIG. 12.

Figure 13:
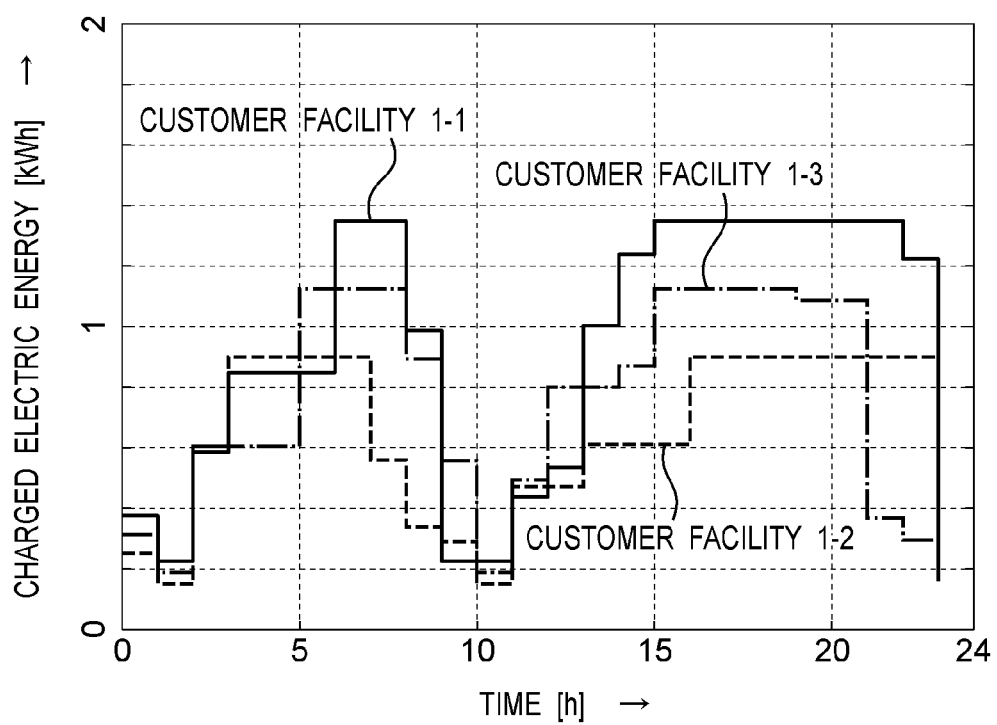
FIG. 13 is a graph showing exemplary temporal variations in charged electric energy of each of the power storage apparatuses 13 of the customer facilities 1 of FIG. 1, in the case with transmitting and receiving power among the customer facilities 1 and without constraints on charging and discharging of the power storage apparatuses 13.

FIG. 13 is a graph showing exemplary temporal variations in charged electric energy of each of the power storage apparatuses 13 of the customer facilities 1 of FIG. 1, in the case with transmitting and receiving power among the customer facilities 1 and without constraints on charging and discharging of the power storage apparatuses 13. FIG. 13 shows the temporal variations in charged electric energy when the charging and discharging power of each customer facility 1 varies as shown in FIG. 12. Assume that the actual capacities of 1.5 kWh, 1.0 kWh, and 1.3 kWh are set for the power storage apparatuses 13 of the customer facilities 1-1, 1-2, and 1-3, respectively. The number of charging and discharging cycles of each of the power storage apparatuses 13 of the customer facilities 1 is calculated based on the actual capacity of the power storage apparatus 13, and based on the increase and decrease in the charged electric energy of the power storage apparatus 13 (that is, a charging electric energy and a discharging electric energy) as shown in FIG. 13. In the example of FIG. 13, each of the power storage apparatuses 13 of the customer facilities 1-1, 1-2, and 1-3 has the number of charging and discharging cycles of 3.1.

FIG. 13 shows that by transmitting and receiving power among the customer facilities 1-1 to 1-3, the capacity necessary for each of the power storage apparatuses 13 of the customer facilities 1-1 to 1-3 decreases as compared to the case of FIG. 10. However, since no constraint is imposed on charging and discharging of the power storage apparatuses 13 in the case of FIG. 13, the number of charging and discharging cycles of each of the power storage apparatuses 13 of the customer facilities 1-1 to 1-3 may increase as compared to the case of FIG. 10.

In step S33 of FIG. 6, the actual capacity determiner 24 determines whether or not the charging and discharging plan can be determined so as to satisfy the peak reduction target powers of the customer facilities 1; if YES, the process proceeds to step S34, and if NO, the process returns to step S32. In step S34, the actual capacity determiner 24 determines whether or not the actual capacities of the power storage apparatuses 13 of the customer facilities 1 are minimized; if YES, the process proceeds to step S35, and if NO, the process returns to step S32 and repeats steps S32 to S34. In step S35, the actual capacity determiner 24 determines the actual capacities currently set, as the actual capacities of the power storage apparatuses 13 for the customer facilities 1.

In this way, by executing the actual capacity determination process of step S3, it is possible to determine the actual capacities sufficient to maintain the power received by each customer facility 1 from the power company facility 3 at the peak reduction target power or lower, under the assumption that power is transmitted and received among the customer facilities 1.

The actual capacity determiner 24 may determine the actual capacities for the customer facilities 1, respectively, or may determine one actual capacity common to the customer facilities 1.

[Characteristic Value Determination Process (Step S6)]

Figure 7:
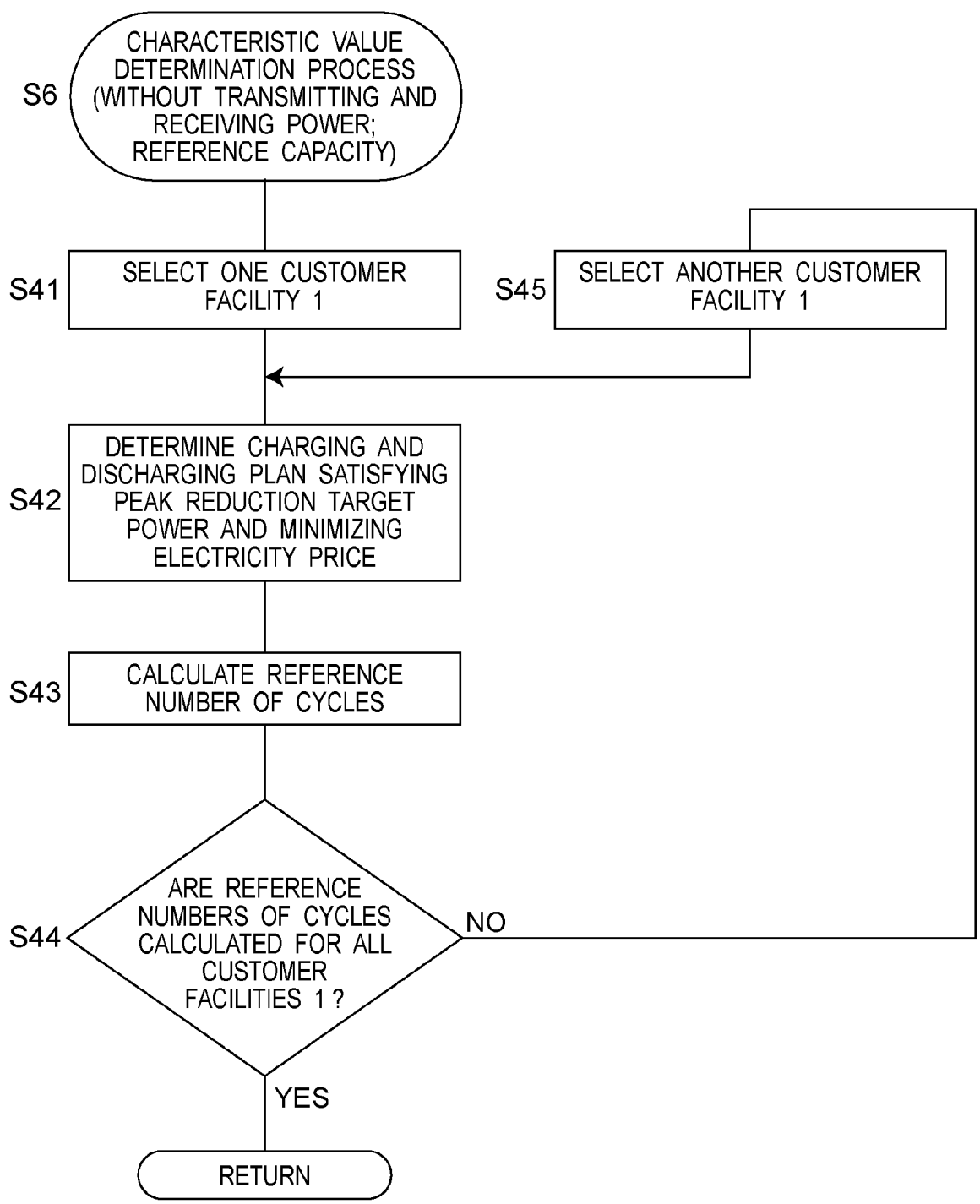
FIG. 7 is a subroutine showing a characteristic value determination process of step S6 in FIG. 3.

FIG. 7 is a subroutine showing the characteristic value determination process of step S6 in FIG. 3.

In step S41 of FIG. 7, the characteristic value determiner 25 selects one customer facility 1.

In step S42, the characteristic value determiner 25 determines a charging and discharging plan of the power storage apparatus 13 of the customer facility 1 selected in step S41, under an assumption that power is not transmitted and received among the customer facilities 1 and that each power storage apparatus 13 has the reference capacity. Specifically, under this assumption, the characteristic value determiner 25 determines a charging and discharging plan of the power storage apparatus 13 for the unit time interval based on the temporal variations in demand power and generated power predicted in step S5, so as to maintain the power received by the customer facility 1 from the power company facility 3 at the peak reduction target power or lower, and to minimize the electricity price for the power received by the customer facility 1 from the power company facility 3. In step S43, the characteristic value determiner 25 calculates the reference number of cycles of the power storage apparatus 13 of the customer facility 1, under an assumption that charging and discharging of the power storage apparatus 13 having the reference capacity are controlled in accordance with this charging and discharging plan determined in step S42.

In step S44, the characteristic value determiner 25 determines whether or not the reference numbers of cycles are determined for all the customer facilities 1; if YES, the process proceeds to step S7 of FIG. 3, and if NO, the process proceeds to step S45 of FIG. 7. In step S45, the characteristic value determiner 25 selects another customer facility 1, and repeats steps S42 to S44.

[Charging and Discharging Plan Determination Process (Step S7)]

Figure 8:
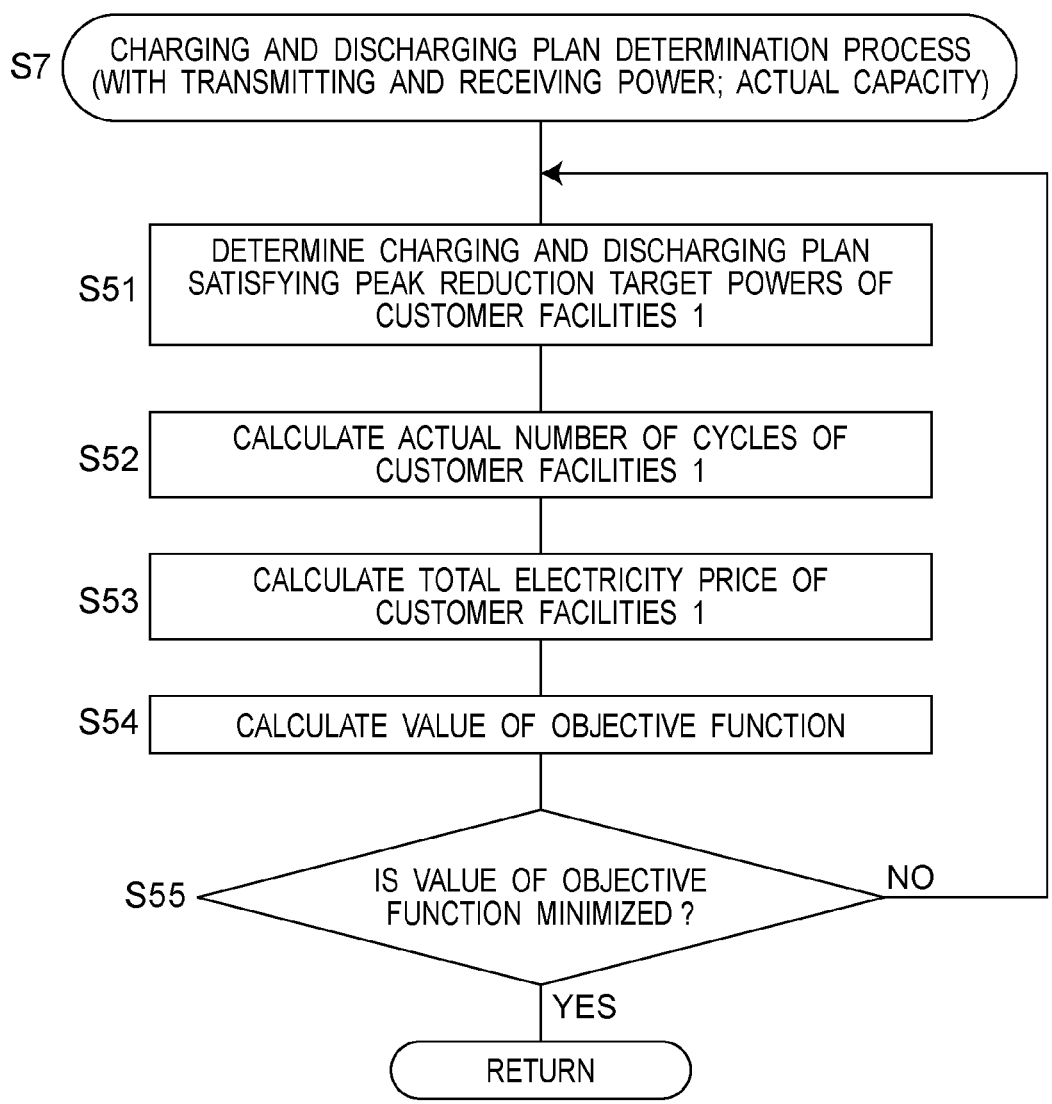
FIG. 8 is a subroutine showing a charging and discharging plan determination process of step S7 in FIG. 3.

FIG. 8 is a subroutine showing the charging and discharging plan determination process of step S7 in FIG. 3.

In step S51 of FIG. 8, the charging and discharging plan determiner 26 determines a charging and discharging plan of the power storage apparatuses 13, under an assumption that power is transmitted and received among the customer facilities 1 and that each power storage apparatus 13 has the actual capacity. Specifically, under this assumption, the charging and discharging plan determiner 26 determines a charging and discharging plan of the power storage apparatuses 13 for the unit time interval based on the temporal variations in demand power and generated power predicted in step S5, so as to maintain the power received by each customer facility 1 from the power company facility 3 at the peak reduction target power or lower.

In step S52, the charging and discharging plan determiner 26 calculates the actual number of cycles of each of the power storage apparatuses 13 of the customer facilities 1, under an assumption that charging and discharging of the power storage apparatuses 13 having the actual capacities are controlled in accordance with the charging and discharging plan determined in step S51. In step S53, the charging and discharging plan determiner 26 calculates the total electricity price of the customer facilities 1, under an assumption that charging and discharging of the power storage apparatuses 13 having the actual capacities are controlled in accordance with the charging and discharging plan determined in step S51. In step S54, the charging and discharging plan determiner 26 calculates the value of the objective function f of the customer facilities 1, based on the reference numbers of cycles, the actual numbers of cycles, and the electricity price.

In step S55 of FIG. 8, the charging and discharging plan determiner 26 determines whether or not the value of the objective function f is minimized; if YES, the process proceeds to step S8 of FIG. 3, and if NO, the process proceeds to step S51 of FIG. 8 and repeats steps S51 to S55.

When satisfying demand power of a certain customer facility 1, the value of the objective function f is reduced by consuming power generated by that customer facility 1 or other customer facilities 1, instead of buying and consuming power from the power company facility 3. In addition, when satisfying demand power of a certain customer facility 1, the value of the objective function f is reduced by buying power from the power company facility 3 and charging the power storage apparatus 13 in advance before the demand power occurs, when the electricity price is lower, instead of buying and consuming power from the power company facility 3 in real time. In addition, when satisfying demand power of a certain customer facility 1, depending on conditions, the value of the objective function f may be reduced by consuming power discharged from the power storage apparatus 13 of that customer facility 1 or other customer facilities 1, instead of buying and consuming power from the power company facility 3. Alternatively, when satisfying demand power of a certain customer facility 1, depending on conditions, the value of the objective function f may be reduced by buying and consuming power from the power company facility 3, instead of consuming power discharged from the power storage apparatus 13 of that customer facility 1 or other customer facilities 1. The value of the objective function f can be reduced by arbitrarily combining these and other operations to determine a charging and discharging plan of the power storage apparatuses 13.

Figure 14:
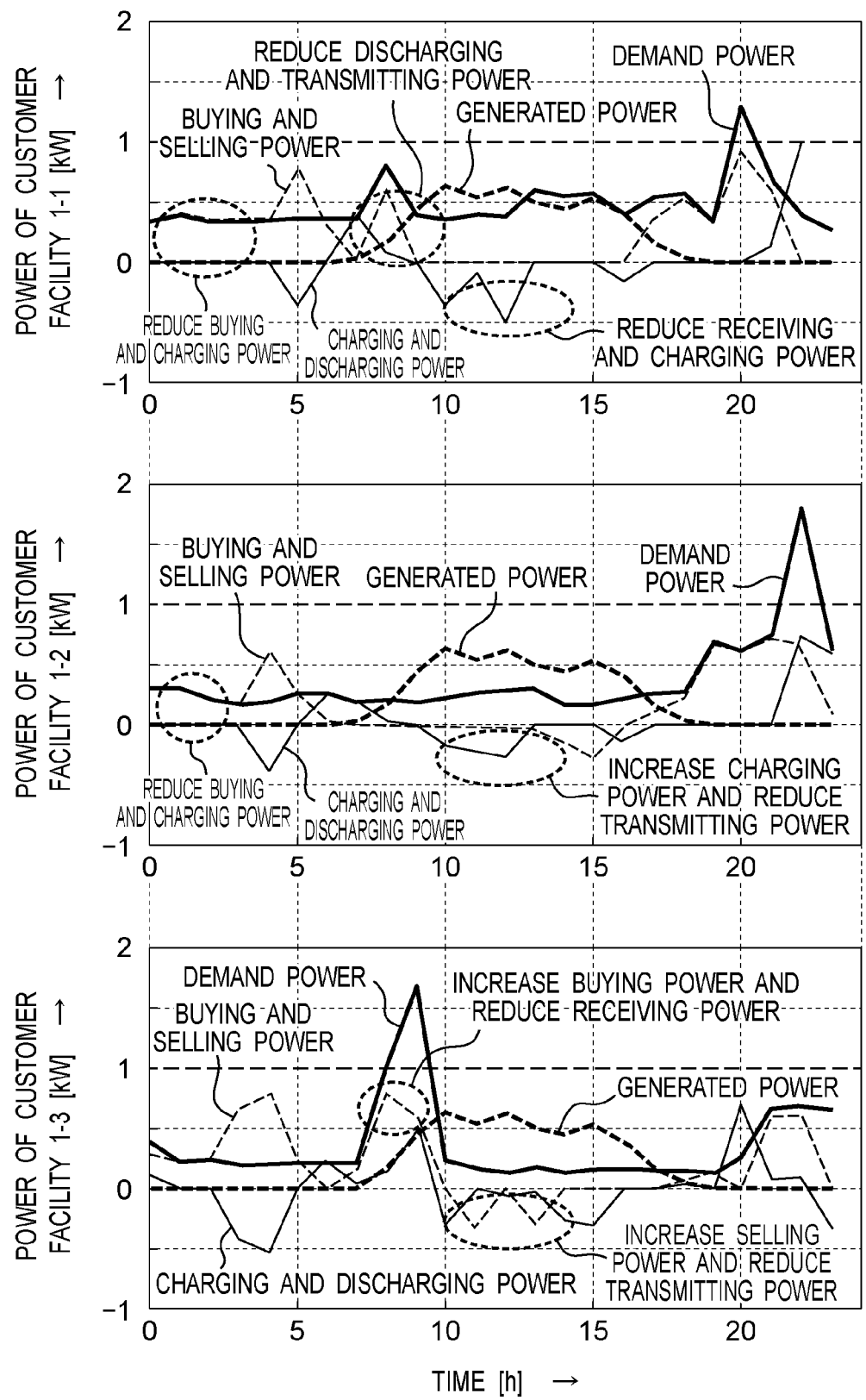
FIG. 14 is a set of graphs showing exemplary temporal variations in demand power, buying and selling power, generated power, and charging and discharging power of each of the customer facilities 1 of FIG. 1, in a case with transmitting and receiving power among the customer facilities 1 and with constraints on charging and discharging of the power storage apparatuses 13.

FIG. 14 is a set of graphs showing exemplary temporal variations in demand power, buying and selling power, generated power, and charging and discharging power of each of the customer facilities 1 of FIG. 1, in a case with transmitting and receiving power among the customer facilities 1 and with constraints on charging and discharging of the power storage apparatuses 13.

By minimizing the value of the objective function f, it is possible to satisfy the constraints on the charging and discharging so as to reduce the increase in the number of charging and discharging cycles as small as possible, as described above.

The demand power and the generated power of each of the customer facilities 1-1 to 1-3 in FIG. 14 are the same as those shown in FIG. 9.

Referring to the top and the middle of FIG. 14, from 0:00 to 5:00, each of the customer facilities 1-1, 1-2 reduces power bought from the power company facility 3 and charging the power storage apparatus 13, than that of FIG. 12. Accordingly, from 0:00 to 5:00, the increase in the number of charging and discharging cycles of the power storage apparatus 13 of each of the customer facilities 1-1, 1-2 is smaller than that of FIG. 12.

Referring to the top of FIG. 14, from 7:00 to 9:00, the customer facility 1-1 reduces power discharged from the power storage apparatus 13 and transmitted to the customer facility 1-3, than that of FIG. 12. Accordingly, from 7:00 to 9:00, the increase in the number of charging and discharging cycles of the power storage apparatus 13 of the customer facility 1-1 is smaller than that of FIG. 12. Referring to the bottom of FIG. 14, from 7:00 to 9:00, the customer facility 1-3 reduces power received from the customer facility 1-1 than that of FIG. 12, and increases power received from the power company facility 3 than that of FIG. 12.

Referring to the middle of FIG. 14, from 9:00 to 13:00, the customer facility 1-2 reduces power charging the power storage apparatus 13 than that of FIG. 12, and instead, increases power transmitted to the customer facility 1-1 than that of FIG. 12. Referring to the bottom of FIG. 14, from 10:00 to 14:00, the customer facility 1-3 increases power sold to the power company facility 3 than that of FIG. 12, and instead, reduces power transmitted to the customer facility 1-1 than that of FIG. 12. Referring to the top of FIG. 14, from 9:00 to 15:00, the customer facility 1-1 reduces power received from the customer facilities 1-2, 1-3 and charging the power storage apparatus 13, than that of FIG. 12. Accordingly, from 9:00 to 15:00, the increase in the number of charging and discharging cycles of the power storage apparatus 13 of the customer facility 1-1 is smaller than that of FIG. 12.

Each customer facility 1 may use the generated power of the power generator apparatus 12, the buying power from the power company facility 3, and/or the receiving power from other customer facilities 1 to be consumed by the load apparatus 11, without charging the power storage apparatus 13, or mat temporarily charge the power storage apparatus 13 for consuming later. It is possible to prevent or reduce the increase in the value of the objective function f by consuming power by the load apparatus 11 without charging the power storage apparatus 13.

When the temporal variations in demand power and generated power of each customer facility 1 are predicted, for example, as shown in FIG. 14, the charging and discharging plan of the power storage apparatuses 13 of the customer facilities 1 in the case with transmitting and receiving power among the customer facilities 1 are determined, for example, as shown by the plots of the charging and discharging power of FIG. 14.

Figure 15:
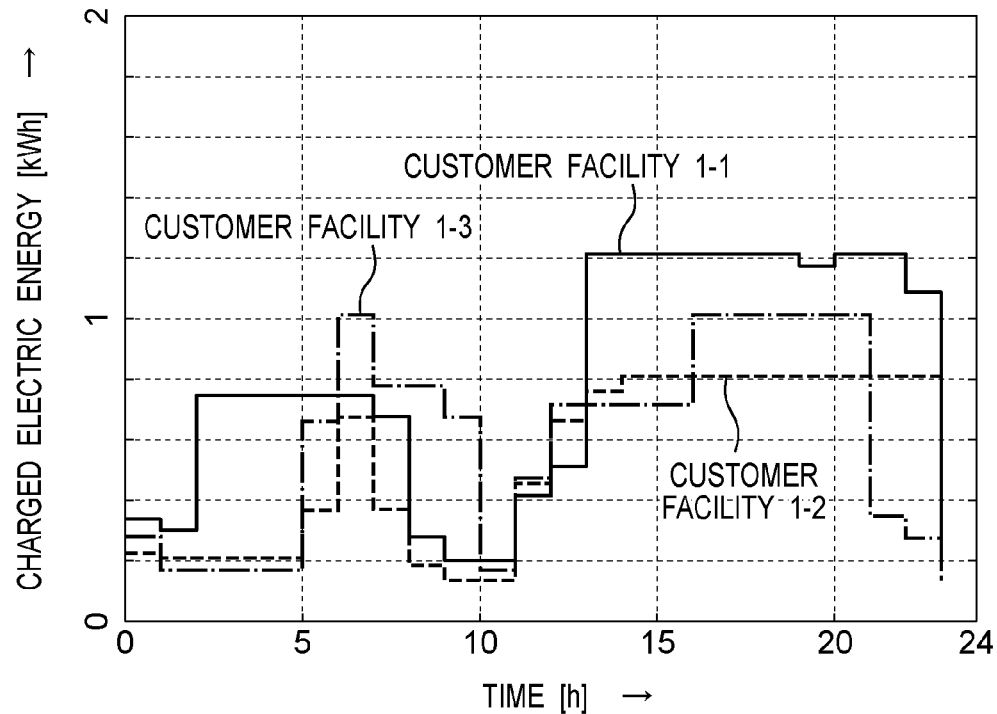
FIG. 15 is a graph showing exemplary temporal variations in charged electric energy of each of the power storage apparatuses 13 of the customer facilities 1 of FIG. 1, in the case with transmitting and receiving power among the customer facilities 1 and with constraints on charging and discharging of the power storage apparatuses 13.

FIG. 15 is a graph showing exemplary temporal variations in charged electric energy of each of the power storage apparatuses 13 of the customer facilities 1 of FIG. 1, in the case with transmitting and receiving power among the customer facilities 1 and with constraints on charging and discharging of the power storage apparatuses 13. FIG. 15 shows the temporal variations in charged electric energy when the charging and discharging power of each customer facility 1 varies as shown in FIG. 14. Assume that the power storage apparatuses 13 of the customer facilities 1-1, 1-2, and 1-3 have the actual capacities of 1.5 kWh, 1.0 kWh, and 1.3 kWh, respectively. The actual number of cycles of each of the power storage apparatuses 13 of the customer facilities 1 is calculated based on the actual capacity of the power storage apparatus 13, and based on the increase and decrease in the charged electric energy of the power storage apparatus 13 (that is, a charging electric energy and a discharging electric energy) as shown in FIG. 15. In the example of FIG. 15, the power storage apparatuses 13 of the customer facilities 1-1, 1-2, and 1-3 have the actual numbers of cycles of 2.1, 2.4, and 3.1, respectively.

FIG. 15 shows that by imposing the constraints on charging and discharging of the power storage apparatuses 13, the numbers of charging and discharging cycles of the power storage apparatuses 13 of the customer facilities 1-1 to 1-3 can be reduced as compared to the case of FIG. 13. In addition, by imposing the constraints on charging and discharging of the power storage apparatuses 13, it is possible to reduce, as compared to the case of FIG. 13, the increase in the numbers of charging and discharging cycles of the power storage apparatuses 13 as compared to the case of FIG. 10, and depending on conditions, it is possible to reduce the numbers of charging and discharging cycles of the power storage apparatuses 13 as compared to the case of FIG. 10.

By repeating steps S51 to S55 of FIG. 8, it is possible to determine a charging and discharging plan of the power storage apparatuses 13 so as to minimize the value of the objective function f.

The objective function f including the term $A_i \times \max(Cb_i - Ca_i, 0)$ regarding the number of charging and discharging cycles means that the constraint is imposed so as to reduce the increase from reference number of cycles $Ca_i$ to the actual number of cycles $Cb_i$, and preferably, to make the actual number of cycles $Cb_i$ smaller than the reference number of cycles $Ca_i$. When this constraint is satisfied, even if power is transmitted and received among the customer facilities 1, the power storage apparatuses 13 are shared among the customer facilities 1, the power storage apparatuses 13 are less likely to significantly degrade, and preferably, the power storage apparatuses 13 are less likely to degrade, as compared to the case without transmitting and receiving power among the customer facilities 1.

In addition, in the power control process of FIG. 3, the relationship between the reference number of cycles and the actual number of cycles (penalty) is set not as hard constraints, but as soft constraints. For example, when the demand power predicted in step S5 of FIG. 3 is higher than the demand power predicted in step S1, and/or the when generated power predicted in step S5 is lower than the generated power predicted in step S1, the actual number of cycles may degrade (that is, increase) from the reference number of cycles. Even in such a case, since the relationship between the reference number of cycles and the actual number of cycles is set as soft constraints, it is possible to determine a charging and discharging plan of the power storage apparatuses 13 so as to reduce the increase from the reference number of cycles to the actual number of cycles as small as possible to minimize the value of the objective function f.

In addition, when a small coefficient $A_i$ is set in the objective function f, the actual number of cycles tends to exceed the reference number of cycles, and increase from the reference number of cycles to the actual number of cycles tends to become larger. Consequently, variations in degradation are likely to occur among the power storage apparatuses 13 of the customer facilities 1. On the other hand, when a large coefficient $A_i$ is set, an increase from the reference number of cycles to the actual number of cycles is reduced, or the actual number of cycles is less likely to exceed the reference number of cycles. Thus, variations in degradation are less likely to occur among the power storage apparatuses 13 of the customer facilities 1.

On the other hand, in the power control process of FIG. 3, the peak reduction target power is set as hard constraints. This is because the electricity price substantially changes depending on whether or not the maximum power received by each customer facility 1 from the power company facility 3 exceeds the peak reduction target power.

Advantageous Effects of First Embodiment

Figure 16:
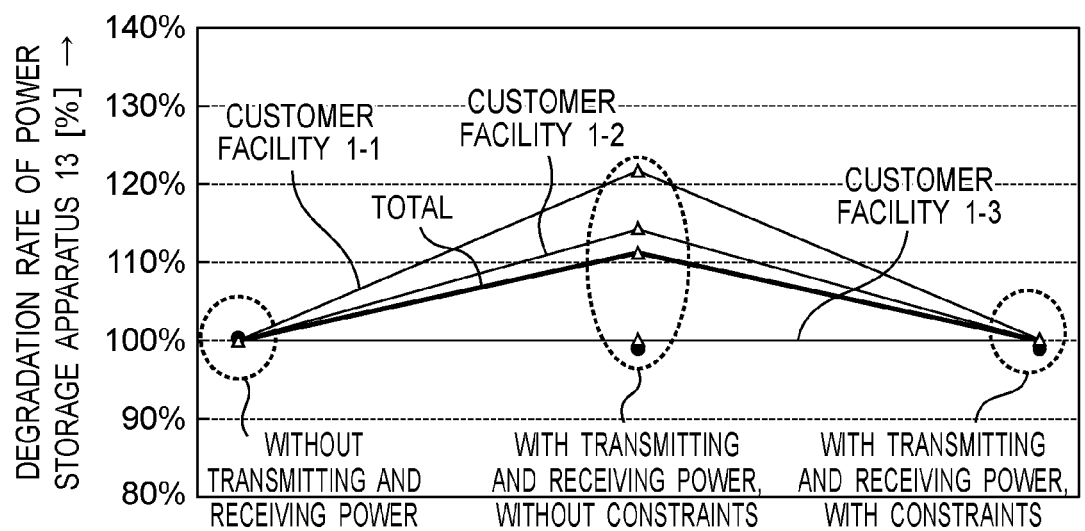
FIG. 16 is a graph showing exemplary degradation rates of the power storage apparatuses 13 in the case without transmitting and receiving power among the customer facilities 1 of FIG. 1, in the case with transmitting and receiving power among the customer facilities 1 of FIG. 1 and without constraints on charging and discharging of the power storage apparatuses 13, and in the case with transmitting and receiving power among the customer facilities 1 of FIG. 1 and with constraints on charging and discharging of the power storage apparatuses 13.

FIG. 16 is a graph showing exemplary degradation rates of the power storage apparatuses 13 in the case without transmitting and receiving power among the customer facilities 1 of FIG. 1, in the case with transmitting and receiving power among the customer facilities 1 of FIG. 1 and without constraints on charging and discharging of the power storage apparatuses 13, and in the case with transmitting and receiving power among the customer facilities 1 of FIG. 1 and with constraints on charging and discharging of the power storage apparatuses 13. Simulations were performed under the conditions of FIGS. 9, 12, and 14. In this case, the degradation rate of the power storage apparatus 13 represents a ratio in percentage of a square root of the actual number of cycles to a square root of the reference number of cycles. In other words, the degradation rate of the power storage apparatus 13 represents the degree of degradation expressed by the actual number of cycles, normalized by the degree of degradation expressed by the reference number of cycles.

FIG. 16 shows that when transmitting and receiving power among the customer facilities 1 without the constraints on charging and discharging of the power storage apparatuses 13 the power storage apparatus 13 of at least a part of the customer facilities 1 degrade from the case without transmitting and receiving power among the customer facilities 1. On the other hand, when transmitting and receiving power among the customer facilities 1 with the constraints on charging and discharging of the power storage apparatuses 13, it is possible to reduce the degradation of the power storage apparatus 13 to the same extent as the case with transmitting and receiving power among the customer facilities 1.

In addition, when power is transmitted and received among the customer facilities 1 with the constraints on charging and discharging of the power storage apparatuses 13, a charging and discharging plan is determined basically so as to reduce the charging power and/or the discharging power of the customer facility 1 of which actual number of cycles exceeds the reference number of cycles in calculation. Accordingly, the actual number of cycles of each customer facility 1 is equal to or smaller than the reference number of cycles, or an excess of the actual number of cycles over the reference number of cycles is minimized. In this case, the degradation of each of the power storage apparatuses 13 of the customer facilities 1 is about the same as when power is not transmitted and received among the customer facilities 1. Thus, it is possible to reduce the variations in degradation among the power storage apparatuses 13 of the customer facilities 1.

Figure 17:
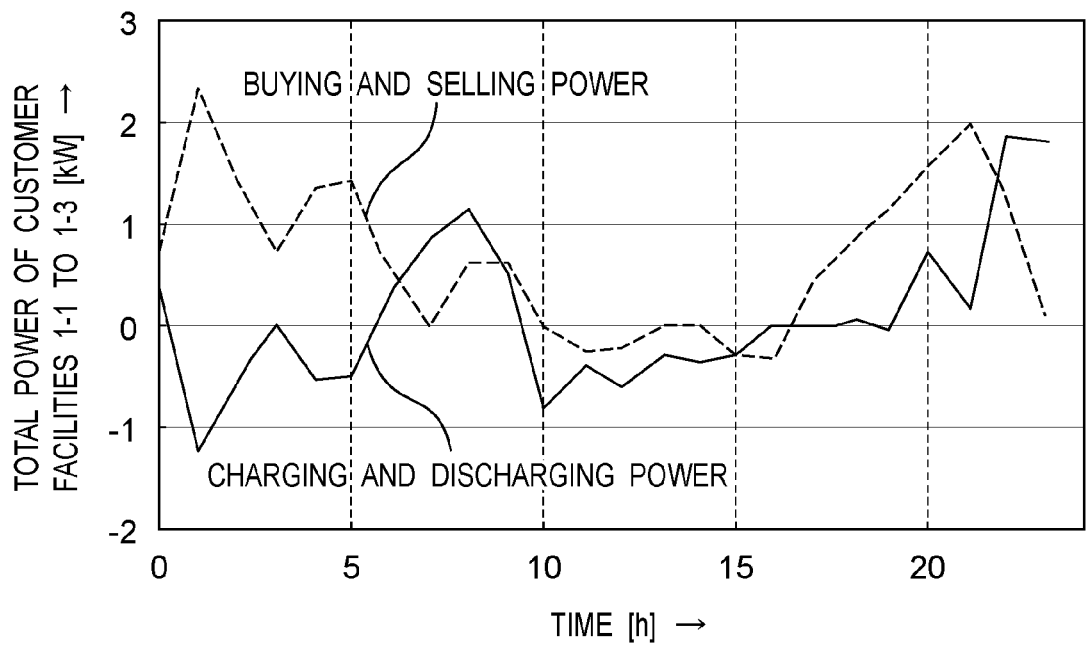
FIG. 17 is a graph showing exemplary temporal variations in total buying and selling power and total charging and discharging power of the customer facilities 1 of FIG. 1, in the case with transmitting and receiving power among the customer facilities 1 and without constraints on charging and discharging of the power storage apparatuses 13.
Figure 18:
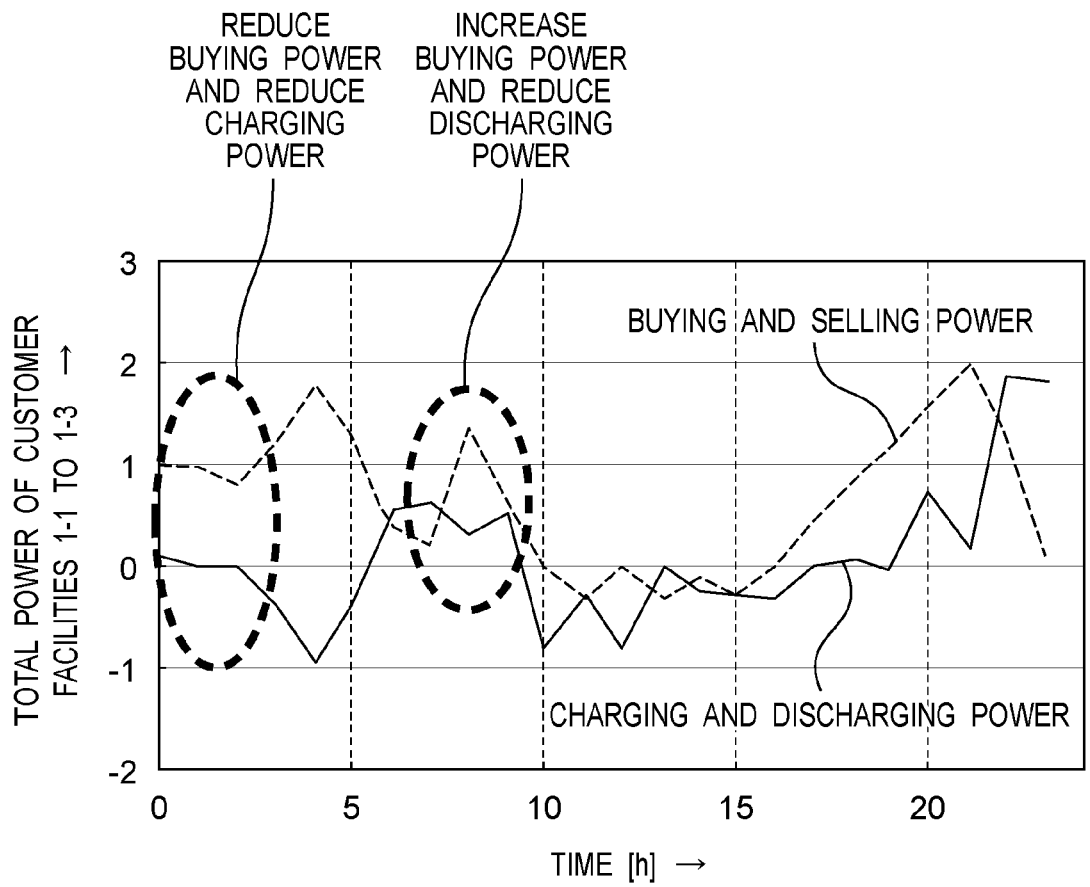
FIG. 18 is a graph showing exemplary temporal variations in total buying and selling power and total charging and discharging power of the customer facilities 1 of FIG. 1, in the case with transmitting and receiving power among the customer facilities 1 and with constraints on charging and discharging of the power storage apparatuses 13.

FIG. 17 is a graph showing exemplary temporal variations in total buying and selling power and total charging and discharging power of the customer facilities 1 of FIG. 1, in the case with transmitting and receiving power among the customer facilities 1 and without constraints on charging and discharging of the power storage apparatuses 13. FIG. 18 is a graph showing exemplary temporal variations in total buying and selling power and total charging and discharging power of the customer facilities 1 of FIG. 1, in the case with transmitting and receiving power among the customer facilities 1 and with constraints on charging and discharging of the power storage apparatuses 13. Assume that the demand power and the generated power are constant. With constraints on charging and discharging of the power storage apparatuses 13, when the charging power decreases, the buying power decreases, and when the discharging power decreases, the buying power increases. Accordingly, the decrease and the increase in the buying power are cancelled with each other, thus reducing an increase in the electricity price, and preferably, reducing the electricity price.

In addition, in the simulation of FIG. 16, the total electricity prices of the customer facilities 1 in the three cases are almost the same with each other. It is considered to arise from, for example, the following factors. Compared to the case without transmitting and receiving power among the customer facilities 1, when transmitting and receiving power among the customer facilities 1, a certain customer facility 1 can receive power from other customer facilities 1, instead of receiving power from the power company facility 3, but the total power to be supplied from the power company facility 3 to the customer facilities 1 is unchanged. In addition, as compared to the case without the constraints on charging and discharging of the power storage apparatuses 13, when imposing the constraints on charging and discharging of the power storage apparatuses 13, the decrease in the buying power resulting from the decrease in the charging power is cancelled with the increase in the buying power resulting from the decrease in the discharging power.

As described above, the power controller apparatus 4 determines the charging and discharging plan of each power storage apparatus 13 for the unit time interval, under an assumption that power is not transmitted and received among the customer facilities 1 and that each power storage apparatus 13 has the reference capacity, and calculates a reference number of cycles when charging and discharging of each power storage apparatus 13 are controlled in accordance with this charging and discharging plan. Then, the power controller apparatus 4 calculates the actual number of cycles when charging and discharging of the power storage apparatuses 13 are controlled under an assumption that power is transmitted and received among the customer facilities 1 and that each power storage apparatus 13 has the actual capacity, and determines a charging and discharging plan of the power storage apparatuses 13 for the unit time interval so as to minimize the value of the objective function. In other words, the power controller apparatus 4 determines a charging and discharging plan in the case where power is transmitted and received among the customer facilities 1 and each power storage apparatus 13 has the actual capacity, based on the calculation results under the assumption that power is not transmitted and received among the customer facilities 1 and that each power storage apparatus 13 has the reference capacity.

The power controller apparatus 4 according to the first embodiment can control the plurality of customer facilities 1 so that their power storage apparatuses 13 are less likely to degrade, even when transmitting and receiving power among the customer facilities 1, and sharing the power storage apparatuses 13 among the customer facilities 1.

In addition, the power controller apparatus 4 according to the first embodiment can reduce the variations in degradation among the power storage apparatuses 13 of the customer facilities 1.

In addition, the power controller apparatus 4 according to the first embodiment can employ the power storage apparatuses 13 each having a relatively small capacity, by transmitting and receiving power among the customer facilities 1, and sharing the power storage apparatuses 13 among the customer facilities 1.

[Modified Embodiment of Power Control Process]

The power control process of FIG. 3 is executed before installing the power storage apparatuses 13 in the customer facilities 1 (steps S1 to S3), and during actually operating the customer facilities 1 at the first time and later (steps S5 to S9). However, when actually operating the customer facilities 1 at the second time and later, a power control process of FIG. 19 may be executed instead of the power control process of FIG. 3.

Figure 19:
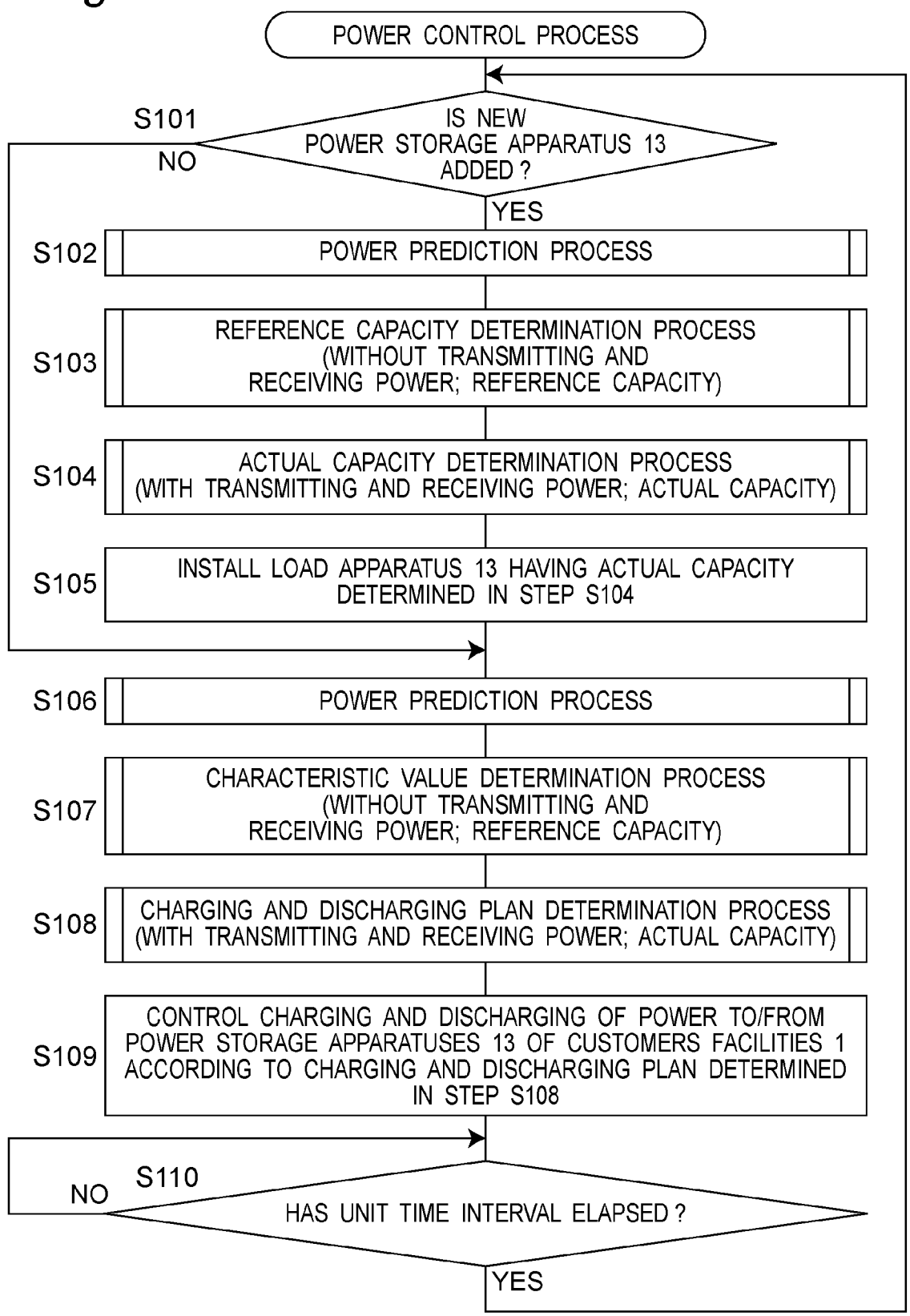
FIG. 19 is a flowchart showing a second power control process executed by the power controller apparatus 4 of FIG. 1.

FIG. 19 is a flowchart showing a second power control process executed by the power controller apparatus 4 of FIG. 1. After step S8 of FIG. 3, the process proceeds to step S101 of FIG. 19, instead of step S9.

In step S101 of FIG. 19, the power controller apparatus 4 determines whether or not a new power storage apparatus 13 is added to the power system; if YES, the process proceeds to step S102, and if NO, the process proceeds to step S106. The new power storage apparatus 13 may be added to the existing customer facility 1, or a new customer facility 1 including the new power storage apparatus 13 may be added to the power system.

In step S102, the predictor 22 executes power prediction process.

Figure 20:
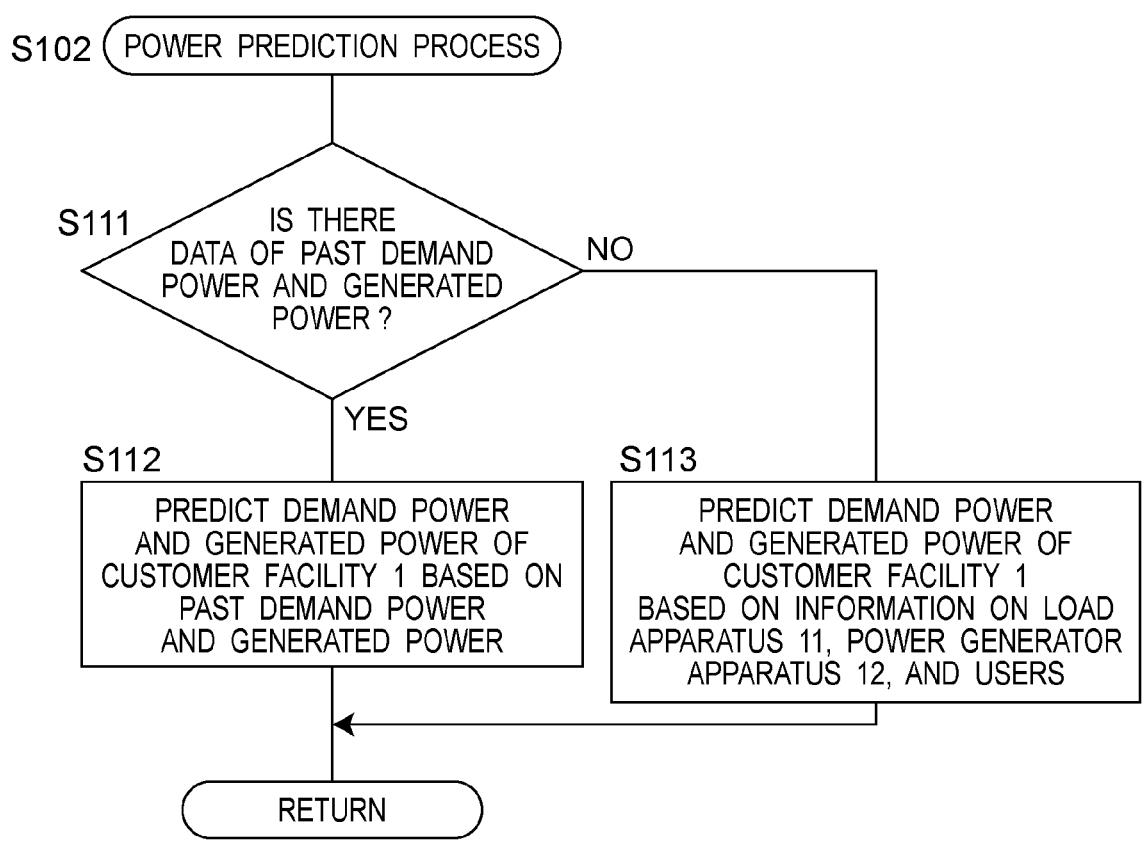
FIG. 20 is a subroutine showing a power prediction process of step S102 in FIG. 19.

FIG. 20 is a subroutine showing the power prediction process of step S102 in FIG. 19.

In step S111 of FIG. 20, the predictor 22 determines whether or not in the memory device 21, there is data on past demand power and past generated power of the customer facility 1 including the power storage apparatus 13 to be added; if YES, the process proceeds to step S112, and if NO, the process proceeds to step S113. In step S112, the predictor 22 predicts temporal variations in demand power and generated power of the customer facility 1 including the power storage apparatus 13 to be added, for the unit time interval, based on the past temporal variations in demand power and generated power of the customer facility 1 including the power storage apparatus 13 to be added. In step S113, the predictor 22 predicts temporal variations in demand power and generated power of the customer facility 1 including the power storage apparatus 13 to be added, for the unit time interval, based on the information on the load apparatus 11, the power generator apparatus 12, and the users stored in the memory device 21

The predictor 22 also predicts temporal variations for the unit time interval in demand power and generated power of the existing customer facilities 1 other than the customer facility 1 including the power storage apparatus 13 to be added.

In step S103 of FIG. 19, the reference capacity determiner 23 executes reference capacity determination process.

Figure 21:
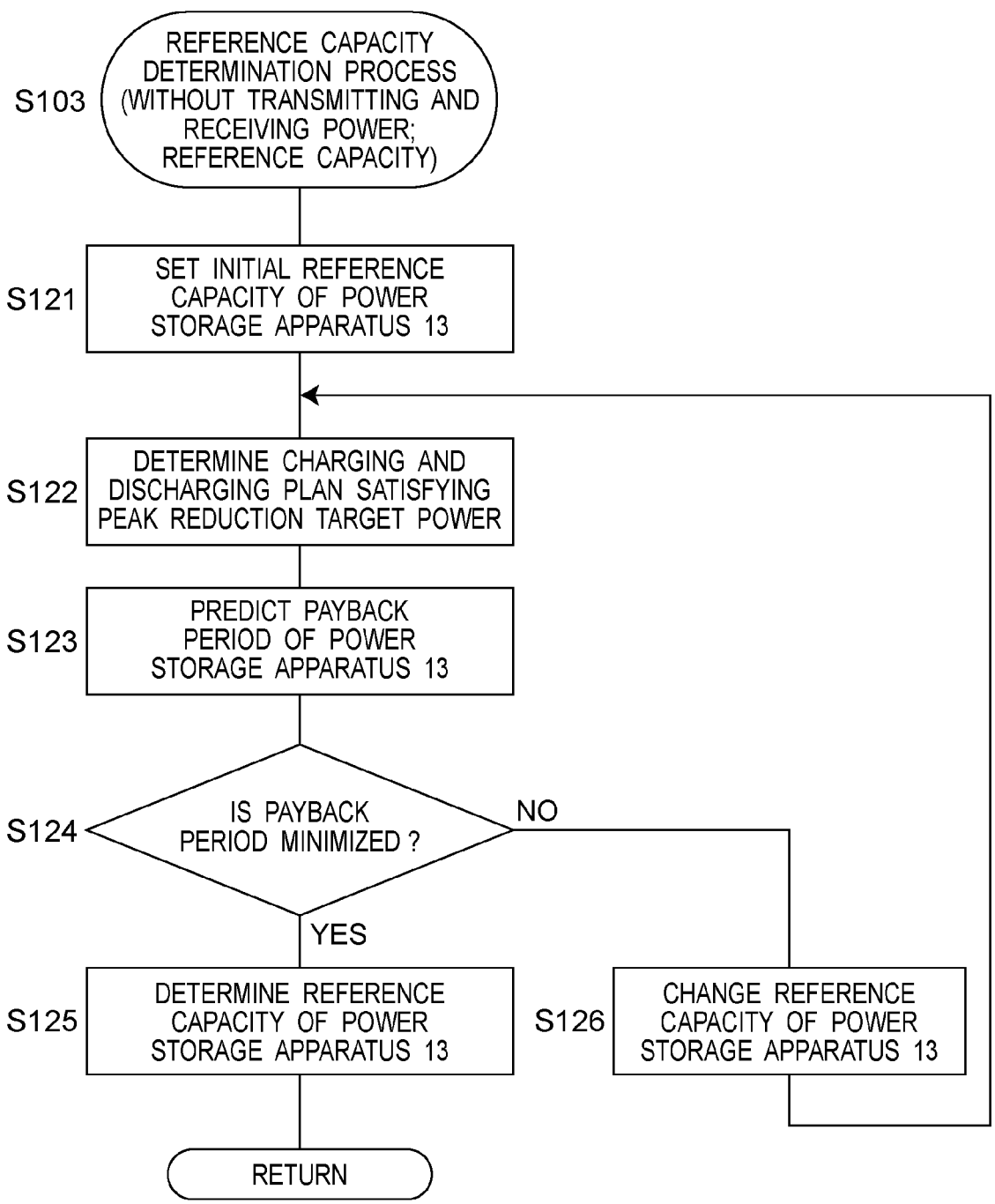
FIG. 21 is a subroutine showing a reference capacity determination process of step S103 in FIG. 19.

FIG. 21 is a subroutine showing the reference capacity determination process of step S103 in FIG. 19.

In step S121 of FIG. 21, the reference capacity determiner 23 sets an initial reference capacity for the power storage apparatus 13 to be added. In step S122, the reference capacity determiner 23 determines a charging and discharging plan satisfying the peak reduction target power. The reference capacity determiner 23 determines a charging and discharging plan of the power storage apparatus 13 to be added, under an assumption that power is not transmitted and received among the customer facilities 1 and that the power storage apparatus 13 has the reference capacity currently set. Specifically, under this assumption, the reference capacity determiner 23 determines a charging and discharging plan of the power storage apparatus 13 to be added, for the unit time interval based on the temporal variations in demand power and generated power predicted in step S102, so as to maintain the power received from the power company facility 3 by the customer facility 1 including the power storage apparatus 13 to be added, at the peak reduction target power or lower. In step S123, the reference capacity determiner 23 predicts the payback period of the power storage apparatus 13 to be added. In step S124, the reference capacity determiner 23 determines whether or not the payback period is minimized; if YES, the process proceeds to step S125, and if NO, the process proceeds to step S126. In step S125, the reference capacity determiner 23 determines the reference capacity currently set, as the reference capacity of the power storage apparatus 13 to be added. In step S126, the reference capacity determiner 23 changes the reference capacity of the power storage apparatus 13 to be added.

In step S104 of FIG. 19, the actual capacity determiner 24 executes actual capacity determination process.

Figure 22:
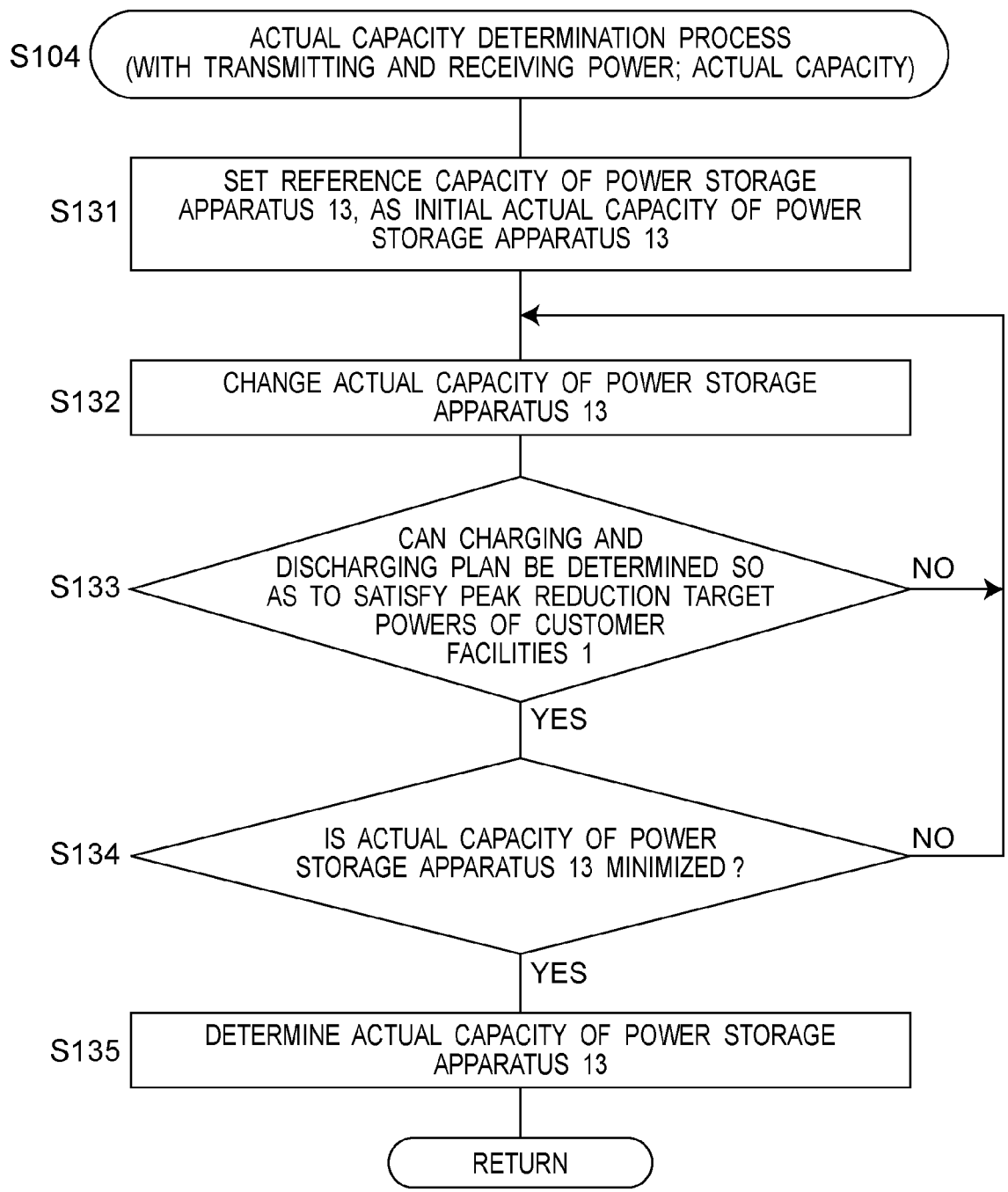
FIG. 22 is a subroutine showing an actual capacity determination process of step S104 in FIG. 19.

FIG. 22 is a subroutine showing the actual capacity determination process of step S104 in FIG. 19.

While the actual capacity of each existing power storage apparatus 13 is predetermined, the actual capacity of the power storage apparatus 13 to be newly added is undetermined. In step S104, the actual capacity of the power storage apparatus 13 to be newly added is determined.

In step S131 of FIG. 22, the actual capacity determiner 24 sets the reference capacity of the power storage apparatus 13 determined in step S103 of FIG. 19, as an initial actual capacity of the power storage apparatus 13 to be added. In step S132, the actual capacity determiner 24 changes the actual capacity of the power storage apparatus 13 to be added. In step S133, the actual capacity determiner 24 tries to determine a charging and discharging plan of the power storage apparatuses 13, under an assumption that power is transmitted and received among the customer facilities 1 and that the power storage apparatus 13 to be added has the actual capacity currently set. Each existing power storage apparatus 13 has the actual capacity determined in step S3 of FIG. 3. Specifically, under this assumption, the actual capacity determiner 24 tries to determine a charging and discharging plan of the power storage apparatuses 13 for the unit time interval based on the temporal variations in demand power and generated power predicted in step S102, so as to maintain the power received by each customer facility 1 from the power company facility 3 at the peak reduction target power or lower. In step S133, the actual capacity determiner 24 determines whether or not the charging and discharging plan can be determined so as to satisfy the peak reduction target powers of the customer facilities 1; if YES, the process proceeds to step S134, and if NO, the process returns to step S132. In step S134, the actual capacity determiner 24 determines whether or not the actual capacity of the power storage apparatus 13 to be added is minimized; if YES, the process proceeds to step S135, and if NO, the process returns to step S132 and repeats steps S132 to S134. In step S135, the actual capacity determiner 24 determines the actual capacity currently set, as the actual capacity of the power storage apparatus 13 to be added.

In step S105 of FIG. 19, the power storage apparatus 13 having the actual capacity determined in step S104 is added to the existing customer facility 1, or the customer facility 1 including the power storage apparatus 13 having this actual capacity is added to the power system.

In step S106, the predictor 22 executes the power prediction process. In step S107, the characteristic value determiner 25 executes characteristic value determination process. In step S108, the charging and discharging plan determiner 26 executes charging and discharging plan determination process. Steps S106 to S108 of FIG. 19 are the same as steps S5 to S7 of FIG. 3, and a charging and discharging plan of the existing power storage apparatuses 13 and the newly added power storage apparatus 13 is determined. In step S109, the power controller apparatus 4 controls charging and discharging of the power storage apparatuses 13 of the customer facilities 1 in accordance with the charging and discharging plan determined in step S108. In step S110, when the unit time interval has elapsed, the process returns to step S101 and repeats steps S101 to S110.

By executing the power control process of FIG. 19, when a new power storage apparatus 13 is added to the power system, it is possible to determine the actual capacity of the new power storage apparatus 13, and determine a charging and discharging plan of the existing power storage apparatuses 13 and the newly added power storage apparatus 13 so as to minimize the value of the objective function f.

[Modified Embodiment of Characteristic Value Associated with Degradation of Power Storage Apparatus]

The characteristic value associated with the degradation of each power storage apparatus 13 is not limited to that based on the number of charging and discharging cycles as described above. Next, modified embodiments of the characteristic value associated with the degradation of each power storage apparatus 13 will be described with reference to FIGS. 23 to 26.

Figure 23:
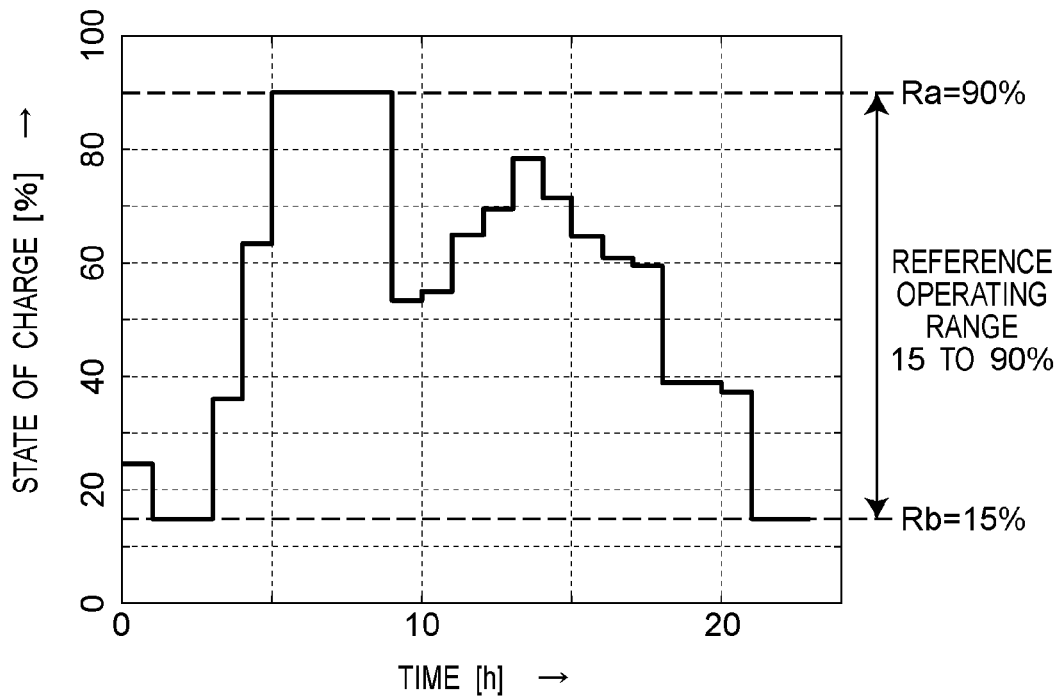
FIG. 23 is a graph for explaining an objective function $f_a$ used by a power system according to a first modified embodiment of the first embodiment.

FIG. 23 is a graph for explaining an objective function $f_a$ used by a power system according to a first modified embodiment of the first embodiment.

The characteristic value associated with the degradation of each power storage apparatus 13 may be, for example, an operation range in which the state of charge of the power storage apparatus 13 varies. The state of charge is given by, for example, a ratio of the current charged electric energy to the capacity of the power storage apparatus 13. The state of charge of the power storage apparatus 13 approaching 100% and 0% facilitates the degradation of the power storage apparatus 13. Accordingly, in order to make the degradation of the power storage apparatus 13 less likely to occur, the constraint is imposed on the charging and discharging so as to reduce an increase in the operation range in which the state of charge varies, as small as possible, as compared to the case without transmitting and receiving power among the customer facilities 1. An expansion in the operation range represents an increase in the likelihood of the degradation of the power storage apparatus 13.

In this case, the characteristic value determiner 25 calculates the operation range in which the state of charge of each power storage apparatus 13 varies, instead of calculating the reference number of cycles, under an assumption that power is not transmitted and received among the customer facilities 1 and that each power storage apparatus 13 has the reference capacity. In the present specification, the operation range determined by the characteristic value determiner 25 is also referred to as a "reference operation range" or a "first characteristic value". In addition, the charging and discharging plan determiner 26 calculates the operation range in which the state of charge of each power storage apparatus 13 varies, instead of calculating the actual number of cycles, under an assumption that power is transmitted and received among the customer facilities 1 and that each power storage apparatus 13 has the actual capacity. In the present specification, the operation range determined by the charging and discharging plan determiner 26 is also referred to as an "actual operation range" or a "second characteristic value". The charging and discharging plan determiner 26 calculates the objective function $f_a$ indicating a degree of degradation from the reference operation range to the actual operation range, and determines a charging and discharging plan of the power storage apparatuses 13 for the unit time interval so as to minimize the value of the objective function $f_a$. An expansion in the operation range represents degradation from the reference operation range to the actual operation range.

For example, the objective function $f_a$ is given as follows.

[Mathematical Expression 2]
$$f_a = \sum_{i=1}^{N} A_i \times (\max(Rc_i - Ra_i, 0) + \max(Rb_i - Rd_i, 0)) + B_i$$

Where $A_i$ and $B_i$ indicate the weight coefficient and the electricity price, respectively, in a manner similar to that of the objective function f as described above. $Ra_i$ indicates a maximum of the reference operation range of the customer facility 1-$i$, and $Rb_i$ indicates a minimum of the reference operation range of the customer facility 1-$i$. $Rc_i$ indicates a maximum of the actual operation range of the customer facility 1-$i$, and $Rd_i$ indicates a minimum of the actual operation range of the customer facility 1-$i$. "$Rc_i - Ra_i$" indicates a penalty imposed when the maximum $Rc_i$ of the actual operation range degrades (that is, increases) from the maximum $Ra_i$ of the reference operation range. "$Rb_i - Rd_i$" indicates a penalty imposed when the minimum $Rd_i$ of the actual operation range degrades (that is, decreases) from the minimum $Rb_i$ of the reference operation range.

FIG. 23 shows a case where the maximum $Ra_i$ of the reference operation range is 90%, the minimum $Rb_i$ of the reference operation range is 15%, and the maximum $Rc_i$ and the minimum $Rd_i$ of the actual operation range are identical to the maximum $Ra_i$ and the minimum $Rb_i$ of the reference operation range, respectively. The objective function $f_a$ including the term regarding the operation range in which the state of charge varies means that a constraint is imposed so as to reduce an excess of the actual operation range over the reference operation range, and preferably, to keep the actual operation range within the reference operation range. In the case that this constraint is satisfied, even when transmitting and receiving power among the customer facilities 1, and sharing the power storage apparatuses 13 among the customer facilities 1, the power storage apparatuses 13 are less likely to significantly degrade, and preferably, less likely to degrade, as compared to the case without transmitting and receiving power among the customer facilities 1.

Figure 24:
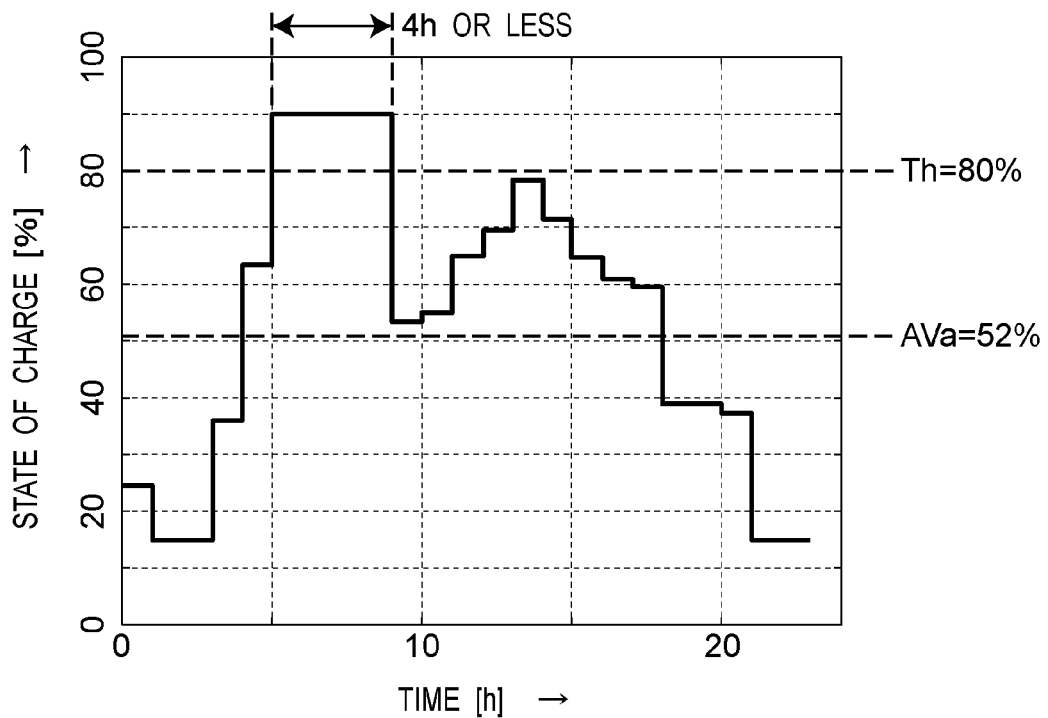
FIG. 24 is a graph for explaining objective functions $f_b$, $f_c$ used by a power system according to a second modified embodiment of the first embodiment.

FIG. 24 is a graph for explaining objective functions $f_b$, $f_c$ used by a power system according to a second modified embodiment of the first embodiment.

The characteristic value associated with the degradation of each power storage apparatus 13 may be, for example, a duration during which the state of charge of the power storage apparatus 13 is continuously maintained at or above a predetermined threshold. Maintaining the power storage apparatus 13 in a high state of charge over a long period facilitates the degradation of the power storage apparatus 13. Accordingly, in order to make the degradation of the power storage apparatus 13 less likely to occur, a constraint is imposed on the charging and discharging so as to reduce an increase in the duration during which the state of charge of the power storage apparatus 13 is continuously maintained at or above the predetermined threshold, as small as possible, as compared to the case without transmitting and receiving power among the customer facilities 1. In the present specification, this threshold is also referred to as a "second threshold". The increase in the duration represents an increase in the likelihood of the degradation of the power storage apparatus 13.

In this case, the characteristic value determiner 25 calculates the duration during which the state of charge of each power storage apparatus 13 is continuously maintained at or above the predetermined threshold, instead of calculating the reference number of cycles, under an assumption that power is not transmitted and received among the customer facilities 1 and that each power storage apparatus 13 has the reference capacity. In the present specification, the duration determined by the characteristic value determiner 25 is also referred to as a "reference high state-of-charge time" or a "first characteristic value". In addition, the charging and discharging plan determiner 26 calculates the duration during which the state of charge of each power storage apparatus 13 is continuously maintained at or above the predetermined threshold, instead of calculating the actual number of cycles, under an assumption that power is transmitted and received among the customer facilities 1 and that each power storage apparatus 13 has the actual capacity. In the present specification, the duration determined by the charging and discharging plan determiner 26 is also referred to as an "actual high state-of-charge time" or a "second characteristic value". The charging and discharging plan determiner 26 calculates the objective function $f_b$ indicating a degree of degradation from the reference high state-of-charge time to the actual high state-of-charge time, and determines a charging and discharging plan of the power storage apparatuses 13 for the unit time interval so as to minimize the value of the objective function $f_b$. An increase in the duration represents degradation from the reference high state-of-charge time to the actual high state-of-charge time.

For example, the objective function $f_b$ is given as follows.

$$f_b = \sum_{i=1}^{N} A_i \times \max(Tb_i - Ta_i, 0) + B_i \quad \text{[Mathematical Expression 3]}$$

Where $A_i$ and $B_i$ indicate the weight coefficient and the electricity price, respectively, in a manner similar to that of the objective function f as described above. $Ta_i$ indicates the reference high state-of-charge time of the customer facility 1-$i$, and $Tb_i$ indicates the actual high state-of-charge time of the customer facility 1-$i$. "$Tb_i-Ta_i$" indicates a penalty imposed when the actual high state-of-charge time $Tb_i$ degrades (that is, increases) from the reference high state-of-charge time $Ta_i$.

FIG. 24 shows a case where the predetermined threshold Th is 80% of the capacity of the power storage apparatus 13, the reference high state-of-charge time $Ta_i$ is 4 hours, and the actual high state-of-charge time $Tb_i$ is within 4 hours. The objective function $f_b$ including the term regarding the duration during which the state of charge is continuously maintained at or above the predetermined threshold means that a constraint is imposed so as to reduce an excess of the actual high state-of-charge time $Tb_i$ over the reference high state-of-charge time $Ta_i$, and preferably, to make the actual high state-of-charge time $Tb_i$ shorter than the reference high state-of-charge time $Ta_i$. In the case that this constraint is satisfied, even when transmitting and receiving power among the customer facilities 1, and sharing the power storage apparatuses 13 among the customer facilities 1, the power storage apparatuses 13 are less likely to significantly degrade, and preferably, the power storage apparatuses 13 are less likely to degrade, as compared to the case without transmitting and receiving power among the customer facilities 1.

The characteristic value associated with the degradation of each power storage apparatus 13 may be, for example, an average of the state of charge of the power storage apparatus 13. As described above, maintaining the power storage apparatus 13 in a high state of charge over a long period facilitates the degradation of the power storage apparatus 13. Accordingly, in order to make the degradation of the power storage apparatus 13 less likely to occur, a constraint is imposed on the charging and discharging so as to reduce an increase in the average of the state of charge, as small as possible, as compared to the case without transmitting and receiving power among the customer facilities 1. The increase in the average represents an increase in the likelihood of the degradation of the power storage apparatus 13.

In this case, the characteristic value determiner 25 calculates the average of the state of charge of each power storage apparatus 13, instead of calculating the reference number of cycles, under an assumption that power is not transmitted and received among the customer facilities 1 and that each power storage apparatus 13 has the reference capacity. In the present specification, the average determined by the characteristic value determiner 25 is also referred to as a "reference average" or a "first characteristic value". In addition, the charging and discharging plan determiner 26 calculates the average of the state of charge of each power storage apparatus 13, instead of calculating the actual number of cycles, under an assumption that power is transmitted and received among the customer facilities 1 and that each power storage apparatus 13 has the actual capacity. In the present specification, the average determined by the charging and discharging plan determiner 26 is also referred to as an "actual average" or a "second characteristic value". The charging and discharging plan determiner 26 calculates the objective function $f_c$ indicating a degree of degradation from the reference average to the actual average, and determines a charging and discharging plan of the power storage apparatuses 13 for the unit time interval so as to minimize the value of the objective function $f_c$. An increase in the average represents degradation from the reference average to the actual average.

For example, the objective function $f_c$ is given by as follows.

$$f_c = \sum_{i=1}^{N} A_i \times \max(AVb_i - AVa_i, 0) + B_i \quad \text{[Mathematical Expression 4]}$$

Where $A_i$ and $B_i$ indicate the weight coefficient and the electricity price, respectively, in a manner similar to that of the objective function f as described above. $AVa_i$ indicates the reference average of the customer facility 1-$i$, and $AVb_i$ indicates the actual average of the customer facility 1-$i$. "$AVb_i-AVa_i$" indicates a penalty imposed when the actual average $AVb_i$ degrades (that is, increases) from the reference average $AVa_i$.

FIG. 24 shows a case where the reference average $AVa_i$ is 52%, and the actual average $AVb_i$ is 52% or less. The objective function $f_c$ including the term regarding the average of the state of charge means that a constraint is imposed so as to reduce an increase from the reference average $AVa_i$ to the actual average $AVb_i$, and preferably, to make the actual average $AVb_i$ smaller than the reference average $AVa_i$. In the case that this constraint is satisfied, even when transmitting and receiving power among the customer facilities 1, and sharing the power storage apparatuses 13 among the customer facilities 1, the power storage apparatuses 13 are less likely to significantly degrade, and preferably, the power storage apparatuses 13 are less likely to degrade, as compared to the case without transmitting and receiving power among the customer facilities 1.

Figure 25:
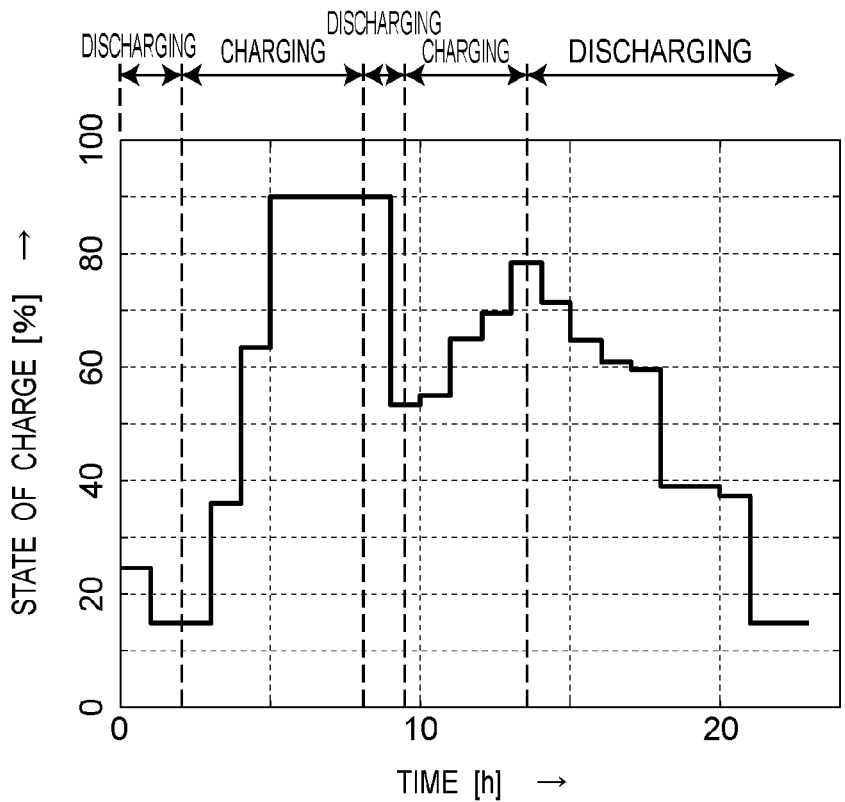
FIG. 25 is a graph for explaining objective functions $f_d$, $f_e$ used by a power system according to a third modified embodiment of the first embodiment.

FIG. 25 is a graph for explaining objective functions $f_d$, $f_e$ used by a power system according to a third modified embodiment of the first embodiment.

The characteristic value associated with the degradation of each power storage apparatus 13 may be, for example, the number of times of switching between charging and discharging of the power storage apparatus 13. Variations in charging power and discharging power of the power storage apparatus 13 result in heating of resistance components, and facilitate the degradation of the power storage apparatus 13. Accordingly, in order to make the degradation of the power storage apparatus 13 less likely to occur, a constraint is imposed on the charging and discharging so as to reduce an increase in the number of times of switching between the charging and discharging, as small as possible, as compared to the case without transmitting and receiving power among the customer facilities 1. The increase in the number of times represents an increase in the likelihood of the degradation of the power storage apparatus 13.

In this case, the characteristic value determiner 25 calculates the number of times of switching between charging and discharging of the power storage apparatuses 13, instead of calculating the reference number of cycles, under an assumption that power is not transmitted and received among the customer facilities 1 and that each power storage apparatus 13 has the reference capacity. In the present specification, the number of times determined by the characteristic value determiner 25 is also referred to as a "reference number of times of switching" or a "first characteristic value". In addition, the charging and discharging plan determiner 26 calculates the number of times of switching between charging and discharging of each power storage apparatus 13 instead of calculating the actual number of cycles, under an assumption that power is transmitted and received among the customer facilities 1 and that each power storage apparatus 13 has the actual capacity. In the present specification, the number of times determined by the charging and discharging plan determiner 26 is also referred to as an "actual number of times of switching" or a "second characteristic value". The charging and discharging plan determiner 26 calculates the objective function $f_d$ indicating a degree of degradation from the reference number of times of switching to the actual number of times of switching, and determines a charging and discharging plan of the power storage apparatuses 13 for the unit time interval so as to minimize the value of the objective function $f_d$. An increase in the number of times represents degradation from the reference number of times of switching to the actual number of times of switching.

For example, the objective function $f_d$ is given as follows.

$$f_d = \sum_{i=1}^{N} A_i \times \max(Nb_i - Na_i, 0) + B_i$$ [Mathematical Expression 5]

Where $A_i$ and $B_i$ indicate the weight coefficient and the electricity price, respectively, in a manner similar to that of the objective function f as described above. $Na_i$ indicates the reference number of times of switching of the customer facility 1-$i$, and $Nb_i$ indicates the actual number of times of switching of the customer facility 1-$i$. "$Nb_i-Na_i$" indicates a penalty imposed when the actual number of times of switching $Nb_i$ degrades (that is, increases) from the reference number of times of switching $Na_i$.

FIG. 25 shows a case where the reference number of times of switching $Na_i$ is 4, and the actual number of times of switching $Nb_i$ is 4. The objective function $f_d$ including the term regarding the number of times of switching between charging and discharging of each power storage apparatus 13 means that a constraint is imposed so as to reduce an increase from the reference number of times of switching to the actual number of times of switching, and preferably, to make the actual number of times of switching equal to or lower than the reference number of times of switching. In the case that this constraint is satisfied, even when transmitting and receiving power among the customer facilities 1, and sharing the power storage apparatuses 13 among the customer facilities 1, the power storage apparatuses 13 are less likely to significantly degrade, and preferably, the power storage apparatuses 13 are less likely to degrade, as compared to the case without transmitting and receiving power among the customer facilities 1.

The characteristic value associated with the degradation of each power storage apparatus 13 may be, for example, the number of times of charging the power storage apparatus 13, and the number of times of discharging the power storage apparatus 13. As described above, variations in charging power and discharging power of the power storage apparatus 13 result in heating of resistance components, and facilitate the degradation of the power storage apparatus 13. Accordingly, in order to make the degradation of the power storage apparatus 13 less likely to occur, a constraint is imposed on the charging and discharging so as to reduce increases in the number of times of charging the power storage apparatus 13 and the number of times of discharging the power storage apparatus 13, as small as possible, as compared to the case without transmitting and receiving power among the customer facilities 1. The increases in the numbers of times represent an increase in the likelihood of the degradation of the power storage apparatus 13.

In this case, the characteristic value determiner 25 calculates the number of times of charging and the number of times of discharging of each power storage apparatus 13, instead of calculating the reference number of cycles, under an assumption that power is not transmitted and received among the customer facilities 1 and that each power storage apparatus 13 has the reference capacity. In the present specification, the number of times of charging and the number of times of discharging determined by the characteristic value determiner 25 are also referred to as a "reference number of times of charging" and a "reference number of times of discharging", or as "first characteristic values". In addition, the charging and discharging plan determiner 26 calculates the number of times of charging and the number of times of discharging of each power storage apparatus 13, instead of calculating the actual number of cycles, under an assumption that power is transmitted and received among the customer facilities 1 and that each power storage apparatus 13 has the actual capacity. In the present specification, the number of times of charging and the number of times of discharging determined by the charging and discharging plan determiner 26 are also referred to as an "actual number of times of charging" and an "actual number of times of discharging", or as "second characteristic values". The charging and discharging plan determiner 26 calculates the objective function $f_e$ indicating a degree of degradation from the reference number of times of charging to the actual number of times of charging, and indicating a degree of degradation from the reference number of times of discharging to the actual number of times of discharging, and determines a charging and discharging plan of the power storage apparatuses 13 for the unit time interval so as to minimize the value of the objective function $f_e$. The increases in the numbers of times represent degradation from the reference number of times of charging to the actual number of times of charging.

For example, the objective function $f_e$ is given as follows.

$$f_e = \sum_{i=1}^{N} A_i \times (\max(Mc_i - Ma_i, 0) + \max(Md_1 - Mb_1, 0)) + B_i$$ [Mathemical Expression 6]

Where $A_i$ and $B_i$ indicate the weight coefficient and the electricity price, respectively, in a manner similar to that of the objective function f as described above. $Ma_i$ indicates the reference number of times of charging of the customer facility 1-$i$, and $Mb_i$ indicates the reference number of times of discharging of the customer facility 1-$i$. $Mc_i$ indicates the actual number of times of charging of the customer facility 1-$i$, and $Md_i$ indicates the actual number of times of discharging of the customer facility 1-$i$. "$Mc_i$–$Ma_i$" indicates a penalty imposed when the actual number of times of charging $Mc_i$ degrades (that is, increases) from the reference number of times of charging $Ma_i$. "$Md_i$–$Mb_i$" indicates a penalty imposed when the actual number of times of discharging $Md_i$ degrades (that is, increases) from the reference number of times of discharging $Mb_i$.

FIG. 25 shows a case where the reference number of times of charging $Ma_i$ is 2, the reference number of times of discharging $Mb_i$ is 3, and the actual number of times of charging $Mc_i$ and the actual number of times of discharging $Md_i$ are identical to the reference number of times of charging $Ma_i$ and the reference number of times of discharging $Mb_i$, respectively. The objective function $f_e$ including the term regarding the number of times of charging each power storage apparatus 13 and the number of times of discharging each power storage apparatus 13 means that a constraint is imposed so as to reduce increases in the actual number of times of charging and the actual number of times of discharging, from the reference number of times of charging and the reference number of times of discharging, respectively, and preferably, to make the actual number of times of charging and the actual number of times of discharging equal to or lower than the reference number of times of charging and the reference number of times of discharging, respectively. In the case that this constraint is satisfied, even when transmitting and receiving power among the customer facilities 1, and sharing the power storage apparatuses 13 among the customer facilities 1, the power storage apparatuses 13 are less likely to significantly degrade, and preferably, the power storage apparatuses 13 are less likely to degrade, as compared to the case without transmitting and receiving power among the customer facilities 1.

Figure 26:
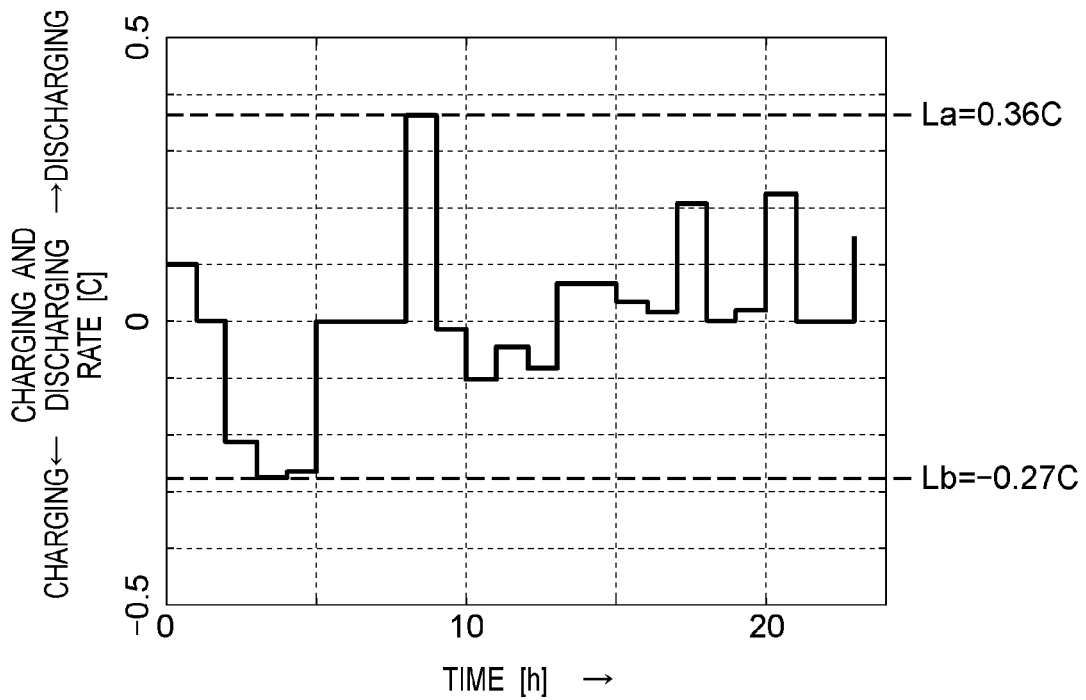
FIG. 26 is a graph for explaining an objective function $f_f$ used by a power system according to a fourth modified embodiment of the first embodiment.

FIG. 26 is a graph for explaining an objective function $f_f$ used by a power system according to a fourth modified embodiment of the first embodiment.

The characteristic value associated with the degradation of each power storage apparatus 13 may be, for example, a range of rate at which the state of charge of the power storage apparatus 13 varies. The rate at which the state of charge varies is given by, for example, current charging power or current discharging power with respect to the capacity of the power storage apparatus 13. Rapid variations in the state of charge of the power storage apparatus 13 facilitate the degradation of the power storage apparatus 13. Accordingly, in order to make the degradation of the power storage apparatus 13 less likely to occur, a constraint is imposed on the charging and discharging so as to reduce an increase in the range of rate at which the state of charge varies, as small as possible, as compared to the case without transmitting and receiving power among the customer facilities 1. An expansion in the range of rate represents an increase in the likelihood of the degradation of the power storage apparatus 13.

In this case, the characteristic value determiner 25 calculates the range of rate at which the state of charge of each power storage apparatus 13 varies, instead of calculating the reference number of cycles, under an assumption that power is not transmitted and received among the customer facilities 1 and that each power storage apparatus 13 has the reference capacity. In the present specification, the range of rate determined by the characteristic value determiner 25 is also referred to as a "reference range of rate" or a "first characteristic value". In addition, the charging and discharging plan determiner 26 calculates the range of rate at which the state of charge of each power storage apparatus 13 varies, instead of calculating the actual number of cycles, under an assumption that power is transmitted and received among the customer facilities 1 and that each power storage apparatus 13 has the actual capacity. In the present specification, the range of rate determined by the charging and discharging plan determiner 26 is also referred to as an "actual range of rate" or a "second characteristic value". The charging and discharging plan determiner 26 calculates the objective function $f_f$ indicating a degree of degradation from the reference range of rate to the actual range of rate, and determines a charging and discharging plan of the power storage apparatuses 13 for the unit time interval so as to minimize the value of the objective function $f_f$. An expansion in the range of rate represents degradation from the reference range of rate to the actual range of rate.

For example, the objective function $f_f$ is given as follows.

$$f_f = \sum_{i=1}^{N} A_i \times (\max(Lc_i - La_i, 0) + \max(Lb_i - Ld_i, 0)) + B_i$$ [Mathematical Expression 7]

Where $A_i$ and $B_i$ indicate the weight coefficient and the electricity price, respectively, in a manner similar to that of the objective function f as described above. $La_i$ indicates a maximum of the reference range of rate of the customer facility 1-$i$, and $Lb_i$ indicates a minimum of the reference range of rate of the customer facility 1-$i$. $Lc_i$ indicates a maximum of the actual range of rate of the customer facility 1-$i$, and $Ld_i$ indicates a minimum of the actual range of rate of the customer facility 1-$i$. In this case, the maximums of the reference range of rate and the actual range of rate indicate the maximum discharging rate, and the minimums of the reference range of rate and the actual range of rate indicate the maximum charging rate. "$Lc_i$–$La_i$" indicates a penalty imposed when the maximum $Lc_i$ of the actual range of rate degrades (that is, increases) from the maximum $La_i$ of the reference range of rate. "$Lb_i-Ld_i$" indicates a penalty imposed when the minimum $Ld_i$ of the actual range of rate degrades (that is, decreases) from the minimum $Lb_i$ of the reference range of rate.

FIG. 26 shows a case where the maximum $La_i$ of the reference range of rate is 0.36, and the minimum $Lb_i$ of the reference range of rate is −0.27, and the maximum $Lc_i$ and the minimum $Ld_i$ of the actual range of rate are identical to the maximum $La_i$ and the minimum $Lb_i$ of the reference range of rate, respectively. The objective function $f_f$ including the term regarding the range of rate at which the state of charge of each power storage apparatus 13 varies means that a constraint is imposed so as to reduce an excess of the actual range of rate over the reference range of rate, and preferably, to keep the actual range of rate within the reference range of rate. In the case that this constraint is satisfied, even when transmitting and receiving power among the customer facilities 1, and sharing the power storage apparatuses 13 among the customer facilities 1, the power storage apparatuses 13 are less likely to significantly degrade, and preferably, the power storage apparatuses 13 are less likely to degrade, as compared to the case without transmitting and receiving power among the customer facilities 1.

Instead of the number of charging and discharging cycles, and the like, illustrated in the present specification, other characteristic values may be employed, which are associated with the degree of degradation of each power storage apparatus 13 for the unit time interval. Instead of the objective function f and the like illustrated in the present specification, other objective functions, including a characteristic value associated with the degree of degradation of each power storage apparatus 13 for the unit time interval, may be employed. In addition, an objective function including a plurality of types of characteristic values may be employed.

Second Embodiment

Customer facilities of a power system are not limited to those equipped with all the load apparatus 11, the power generator apparatus 12, and the power storage apparatus 13 as shown in FIG. 1. The power system may include a customer facility without the power generator apparatus 12, and may include a customer facility without the power storage apparatus 13.

Figure 27:
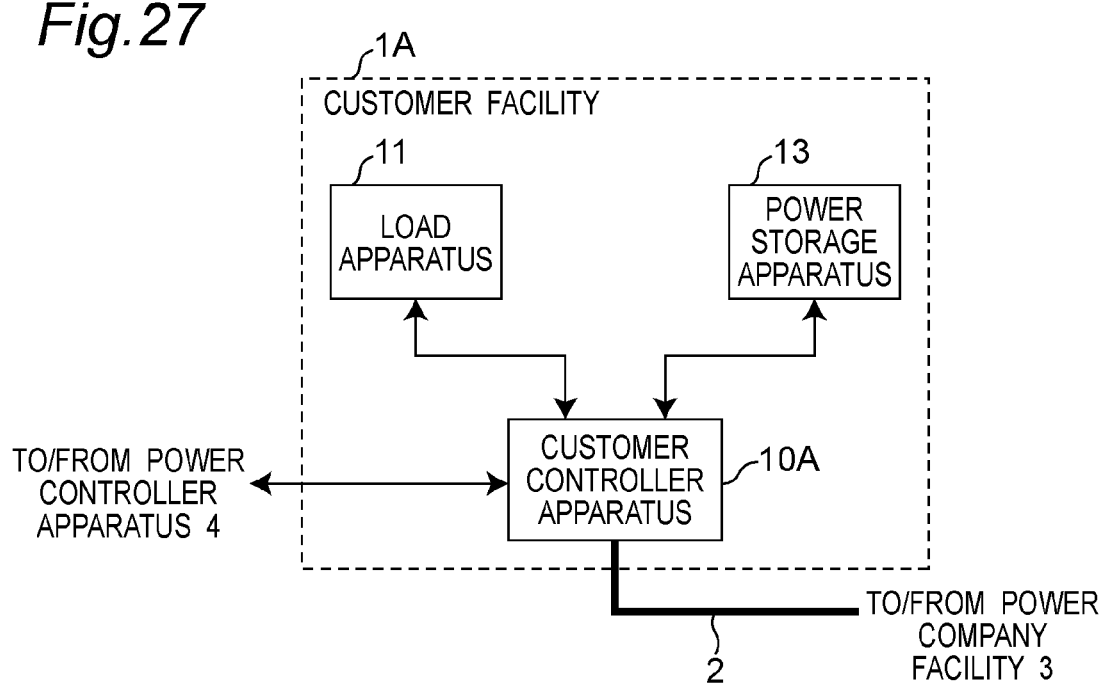
FIG. 27 is a block diagram of a configuration of a customer facility 1A included in a power system according to a second embodiment.

FIG. 27 is a block diagram of a configuration of a customer facility 1A included in a power system according to a second embodiment. The customer facility 1A is provided with a customer controller apparatus 10A, a load apparatus 11, and a power storage apparatus 13. The customer controller apparatus 10A is configured in a manner similar to that of the customer controller apparatus 10 of FIG. 1, except for not monitoring generated power of a power generator apparatus.

Figure 28:
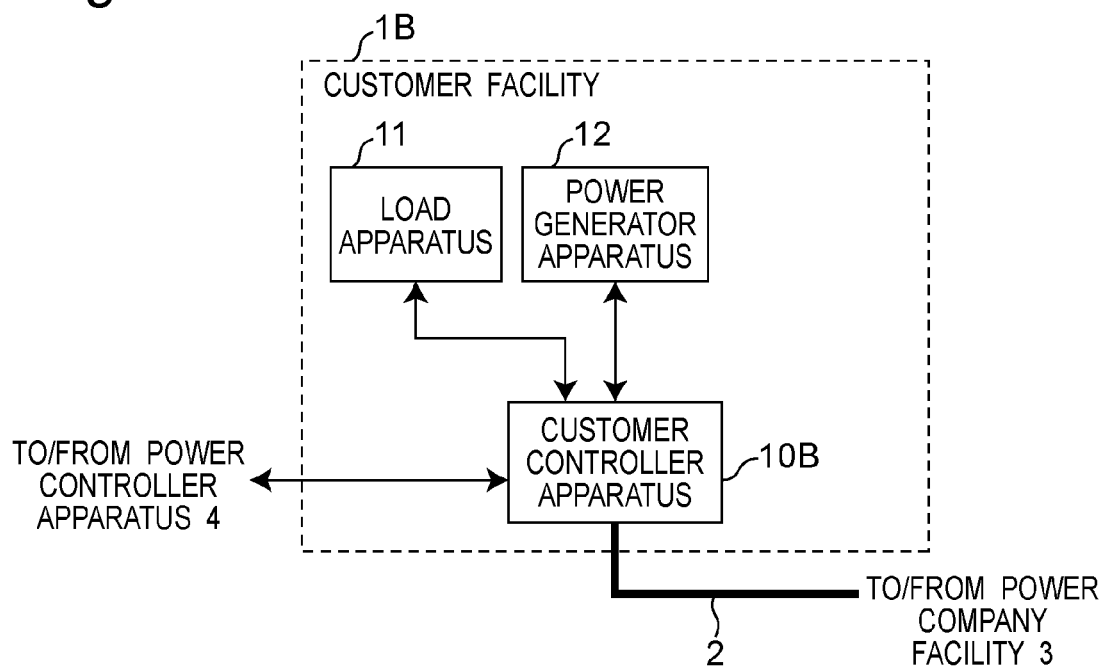
FIG. 28 is a block diagram of a configuration of a customer facility 1B included in the power system according to the second embodiment.

FIG. 28 is a block diagram of a configuration of a customer facility 1B included in the power system according to the second embodiment. The customer facility 1B is provided with a customer controller apparatus 10B, a load apparatus 11, and a power generator apparatus 12. The customer controller apparatus 10B is configured in the manner similar to that of the customer controller apparatus 10 of FIG. 1, except for not monitoring a charged electric energy of a power storage apparatus.

Figure 29:
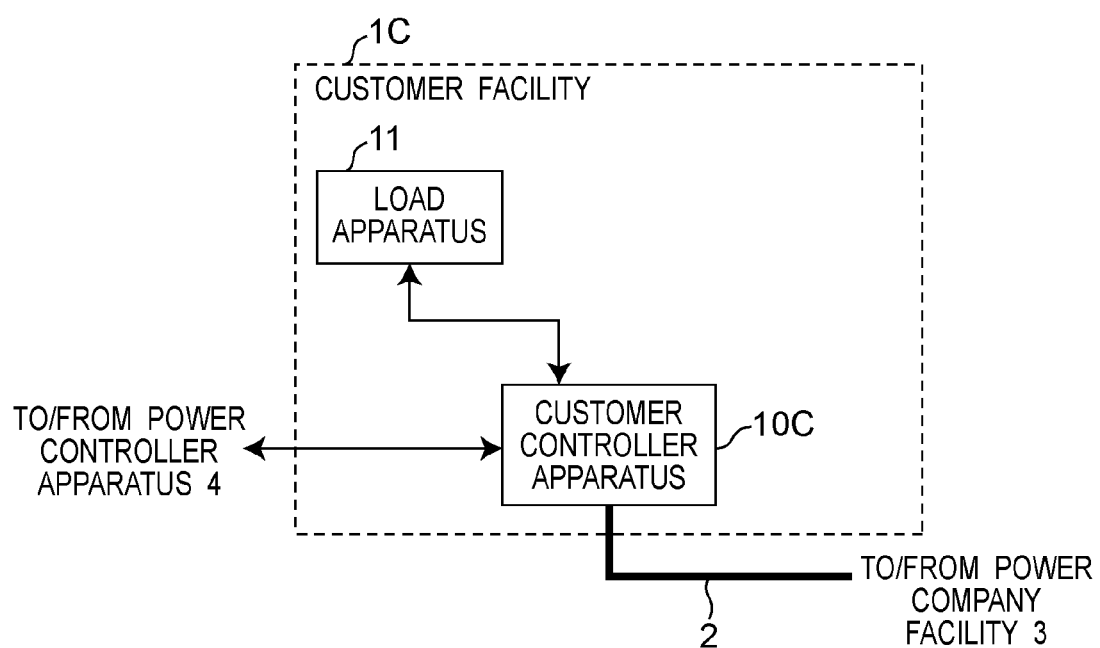
FIG. 29 is a block diagram of a configuration of a customer facility 1C included in the power system according to the second embodiment.

FIG. 29 is a block diagram of a configuration of a customer facility 1C included in the power system according to the second embodiment. The customer facility 1C is provided with a customer controller apparatus 10C, and a load apparatus 11. The customer controller apparatus 10C is configured in the manner similar to that of the customer controller apparatus 10 of FIG. 1, except for not monitoring generated power of a power generator apparatus 12 and a charged electric energy of a power storage apparatus.

In the power system according to the second embodiment, all the customer facilities (the customer facilities 1, 1A to 1C) are provided with the load apparatuses 11. In the power system according to the second embodiment, at least one of the customer facilities (the customer facilities 1, 1B) is further provided with the power generator apparatus 12. In the power system according to the second embodiment, at least two of the customer facilities (the customer facilities 1, 1A) are further provided with the power storage apparatuses 13. The power system according to the second embodiment may include any combination of the customer facilities 1, 1A to 1C, as long as it includes at least two customer facilities 1, 1A each provided with the power storage apparatuses 13.

A power controller apparatus 4 according to the second embodiment is configured in a manner similar to that of the power controller apparatus 4 according to the first embodiment, and executes power control processes of FIGS. 3 and 19. However, for the customer facilities 1A, 1C having no power generator apparatus, the power controller apparatus 4 according to the second embodiment does not predict generated power, but predicts only demand power. For the customer facilities 1A, 1C having no power generator apparatus, the power controller apparatus 4 according to the second embodiment determines the reference capacity and the actual capacity based on the predicted demand power, calculates the first and second characteristic values based on the predicted demand power, and determines a charging and discharging plan based on the predicted demand power.

The power system according to the second embodiment can control the customer facilities 1 in a manner similar to that in the first embodiment so that each power storage apparatus 13 is less likely to degrade, even when there is a customer facility without at least one of a power generator apparatus and a power storage apparatus.

The power system according to the first or second embodiment may be connected to other power supply facilities capable of supplying sufficient power to the customer facilities 1, 1A to 1C (for example, a local power generator apparatus, etc.), instead of the power company facility 3. In this case, the maximum power received by each of the customer facilities 1, 1A to 1C from the power supply facility is limited to a predetermined threshold or less which is considered not to significantly affect other customer facilities. This threshold corresponds to the "peak reduction target power" or "first threshold" as mentioned above.

The power system according to the first or second embodiment may be connected to both the power company facility 3 and other power supply facilities.

Third Embodiment

Figure 30:
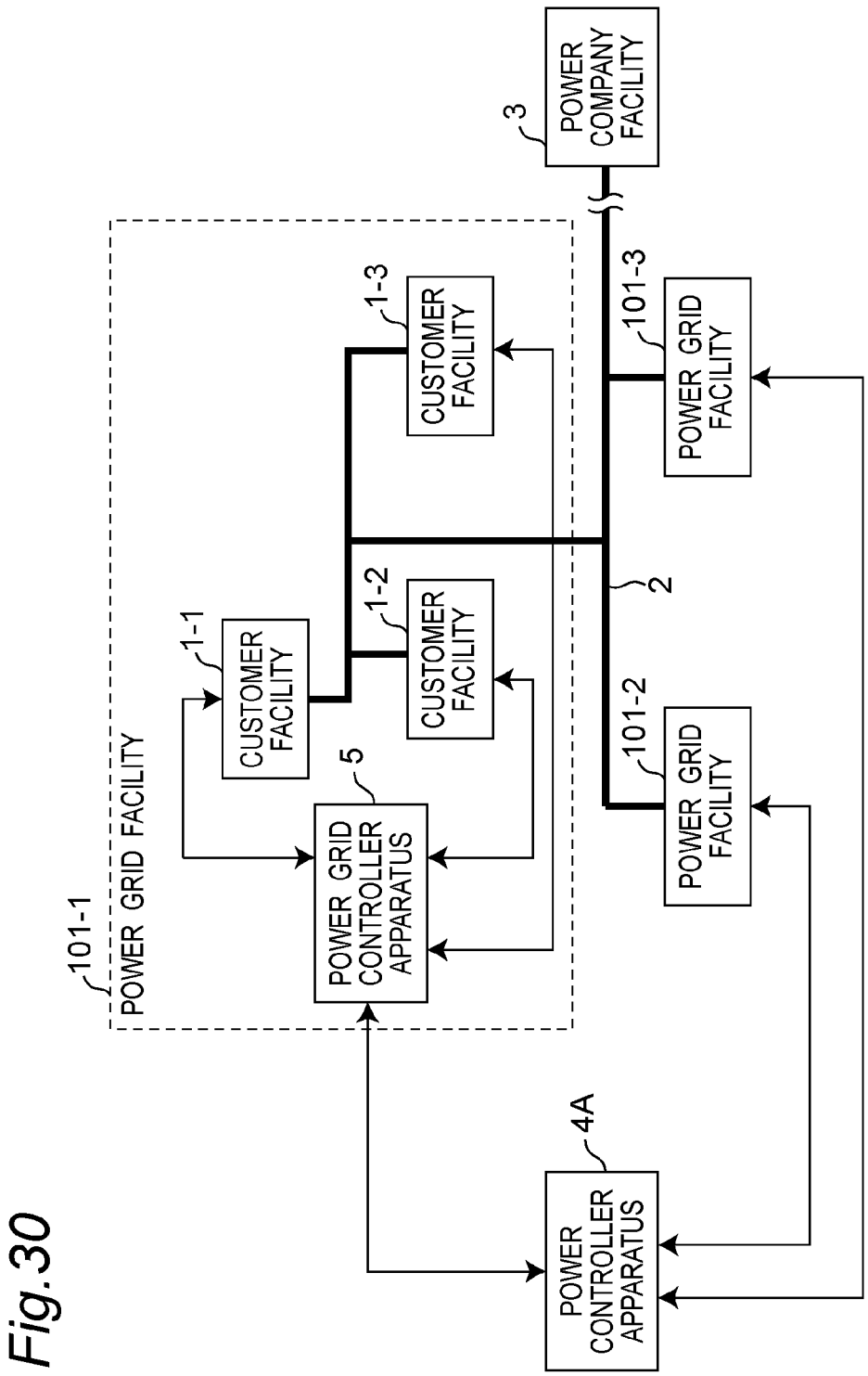
FIG. 30 is a block diagram of a configuration of a power system according to a third embodiment.

FIG. 30 is a block diagram of a configuration of a power system according to a third embodiment. The power system of FIG. 30 includes a plurality of power grid facilities 101-1 to 101-3, a power network 2, a power company facility 3, and a power controller apparatus 4A.

The power grid facility 101-1 includes a plurality of customer facilities 1-1 to 1-3 and a power grid controller apparatus 5. The customer facilities 1-1 to 1-3 of the power grid facility 101-1 are configured in a manner similar to that of the customer facility 1 of FIG. 1, the customer facility 1A of FIG. 27, the customer facility 1B of FIG. 28, or the customer facility 1C of FIG. 29. The power grid controller apparatus 5 monitors demand power of a load apparatus 11, generated power of a power generator apparatus 12, and charged electric energy of a power storage apparatus 13 of each customer facility 1 included in the power grid facility 101-1, and notifies the power controller apparatus 4A of the monitored results.

The other power grid facilities 101-2 to 101-3 are also configured in a manner similar to that of the power grid facility 101-1. In the present specification, the power grid facilities 101-1 to 101-3 are also collectively referred to as "power grid facilities 101".

The power controller apparatus 4A is configured in a manner substantially similar to that of the power controller apparatus 4 of FIG. 2, and provided with a memory device, a predictor, a reference capacity determiner, an actual capacity determiner, a characteristic value determiner, and a charging and discharging plan determiner.

The memory device of the power controller apparatus 4A stores, for each power grid facility 101, at least a part of past temporal variations in demand power, past temporal variations in generated power, information on the load apparatuses 11, information on the power generator apparatus 12, and user information.

The predictor of the power controller apparatus 4A predicts temporal variations in demand power of the load apparatuses 11 and generated power of the power generator apparatus 12 of each power grid facility 101 for a unit time interval, based on the information stored in the memory device.

The reference capacity determiner of the power controller apparatus 4A determines a capacity of each power storage apparatus 13 based on the predicted temporal variations in demand power and generated power, the capacity being necessary to maintain power received by each power grid facility 101 from the power company facility 3 at the peak reduction target power or lower, under an assumption that power is not transmitted and received among the power grid facilities 101. In the present specification, this capacity is referred to as a "reference capacity". The reference capacity may be set to a minimum capacity satisfying the above-mentioned conditions.

The actual capacity determiner of the power controller apparatus 4A determines a capacity of each power storage apparatus 13 based on the predicted temporal variations in demand power and generated power, the capacity being necessary to maintain the power received by each power grid facility 101 from the power company facility 3 at the peak reduction target power or lower, under an assumption that power is transmitted and received among the power grid facilities 101. In the present specification, this capacity is referred to as an "actual capacity". The actual capacity may be set to a minimum capacity satisfying the above-mentioned conditions.

The characteristic value determiner of the power controller apparatus 4A determines a charging and discharging plan for controlling charging and discharging of the power storage apparatuses 13, under an assumption that power is not transmitted and received among the power grid facilities 101 and that each power storage apparatus 13 has the reference capacity. Specifically, under this assumption, the characteristic value determiner determines a charging and discharging plan of each power storage apparatus 13 for the unit time interval based on the predicted temporal variations in demand power and generated power, so as to maintain the power received by each power grid facility 101 from the power company facility 3 at the peak reduction target power or lower. The characteristic value determiner calculates a characteristic value associated with a degree of degradation of each power storage apparatus 13 for the unit time interval, under an assumption that charging and discharging of the power storage apparatus 13 having the reference capacity are controlled in accordance with this charging and discharging plan. The characteristic value is, for example, the number of charging and discharging cycles of each power storage apparatus 13 for the unit time interval. In the present specification, the number of charging and discharging cycles determined by the characteristic value determiner is also referred to as a "reference number of cycles" or a "first characteristic value".

The charging and discharging plan determiner of the power controller apparatus 4A determines a charging and discharging plan for controlling charging and discharging of the power storage apparatuses 13, under an assumption that power is transmitted and received among the power grid facilities 101 and that each power storage apparatus 13 has the actual capacity. Specifically, under this assumption, the charging and discharging plan determiner determines a charging and discharging plan of the power storage apparatuses 13 for the unit time interval based on the predicted temporal variations in demand power and generated power, so as to maintain the power received by each power grid facility 101 from the power company facility 3 at the peak reduction target power or lower. The charging and discharging plan determined by the charging and discharging plan determiner includes temporal variations in charging power and discharging power of each power storage apparatus 13 for the unit time interval, and further includes temporal variations in transmitting power and receiving power among the power grid facilities 101. The charging and discharging plan determiner calculates a characteristic value associated with the degree of degradation of each power storage apparatus 13 for the unit time interval, that is, the number of charging and discharging cycles of each power storage apparatus 13 for the unit time interval, under an assumption that charging and discharging of the power storage apparatuses 13 having the actual capacities are controlled in accordance with this charging and discharging plan. In the present specification, the number of charging and discharging cycles determined by the charging and discharging plan determiner is also referred to as an "actual number of cycles" or a "second characteristic value". The charging and discharging plan determiner calculates an objective function f indicating a degree of degradation from the reference number of cycles to the actual number of cycles, and determines a charging and discharging plan of the power storage apparatuses 13 having the actual capacities for the unit time interval so as to minimize the value of the objective function f.

Figure 31:
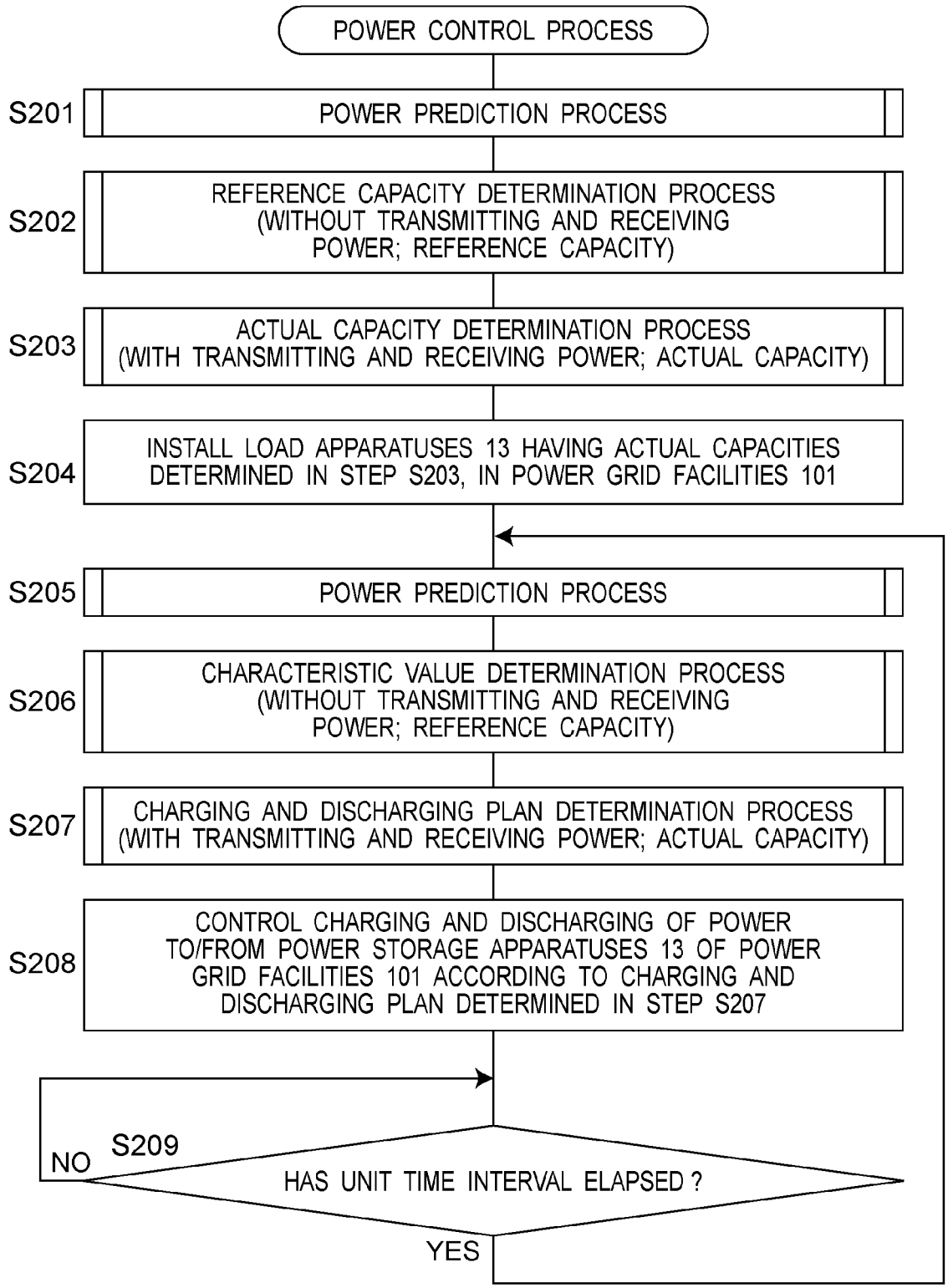
FIG. 31 is a flowchart showing a power control process executed by a power controller apparatus 4A of FIG. 30.

FIG. 31 is a flowchart showing a power control process executed by the power controller apparatus 4A of FIG. 30.

In step S201, the predictor of the power controller apparatus 4A executes power prediction process. In this step, the predictor predicts temporal variations in demand power and generated power of each power grid facility 101 for the unit time interval. In step S202, the reference capacity determiner of the power controller apparatus 4A executes reference capacity determination process. In this step, the reference capacity determiner determines the reference capacity of each power storage apparatus 13 under an assumption that power is not transmitted and received among the power grid facilities 101. In step S203, the actual capacity determiner of the power controller apparatus 4A executes actual capacity determination process. In this step, the actual capacity determiner determines the actual capacity of each power storage apparatus 13, under an assumption that power is transmitted and received among the power grid facilities 101.

Steps S201 to S203 are preparatory processing for determining the capacity of each power storage apparatus 13 of the power grid facilities 101, to be executed before installing the power storage apparatuses 13 in the power grid facilities 101 (that is, before actual operation of the power grid facilities 101). In step S204, the power storage apparatuses 13 having the actual capacities determined in step S203 are installed in the power grid facilities 101.

In step S205, the predictor of the power controller apparatus 4A executes the power prediction process. In this step, the predictor predicts temporal variations in demand power and generated power of each power grid facility 101 for the unit time interval. In step S206, the characteristic value determiner of the power controller apparatus 4A executes characteristic value determination process. In this step, the characteristic value determiner determines a charging and discharging plan of each power storage apparatus 13 for the unit time interval, under an assumption that power is not transmitted and received among the power grid facilities 101 and that each power storage apparatus 13 has the reference capacity, and calculates the reference number of cycles when charging and discharging of each power storage apparatus 13 are controlled in accordance with this charging and discharging plan. In step S207, the charging and discharging plan determiner of the power controller apparatus 4A executes charging and discharging plan determination process. In this step, the charging and discharging plan determiner calculates the actual number of cycles when charging and discharging of the power storage apparatuses 13 are controlled under an assumption that power is transmitted and received among the power grid facilities 101 and that each power storage apparatus 13 has the actual capacity, and determines a charging and discharging plan of the power storage apparatuses 13 for the unit time interval so as to minimize the value of the objective function f. In step S208, the power controller apparatus 4A controls charging and discharging of the power storage apparatuses 13 of the power grid facilities 101 in accordance with the charging and discharging plan determined in step S207. In step S209, when the unit time interval has elapsed, the process returns to step S205 and repeats steps S205 to S209.

Steps S205 to S209 are operational processes in which the power grid facilities 101 are actually operated to control consuming, transmitting, receiving, charging, and discharging power in the power grid facilities 101.

The power control process of FIG. 31 is executed before installing the power storage apparatuses 13 in the power grid facilities 101 (steps S201 to S203), and during actually operating the power grid facilities 101 at the first time and later (steps S205 to S209). However, when actually operating the power grid facilities 101 at the second time and later, a process similar to the power control process of FIG. 19 may be executed instead of the power control process of FIG. 31.

The power controller apparatus 4A according to the third embodiment can control the plurality of power grid facilities 101 so that their power storage apparatuses 13 are less likely to degrade, even when transmitting and receiving power among the power grid facilities 101, and sharing the power storage apparatuses 13 among the power grid facilities 101.

It can be seen that the power controller apparatus 4A according to the third embodiment is applicable to a power system larger than the power system according to the first embodiment.

The power controller apparatus 4A according to the third embodiment may also employ a characteristic value described with reference to FIGS. 23 to 26 or other characteristic values, instead of the number of charging and discharging cycles, as the characteristic value associated with the degree of degradation of each power storage apparatus 13 for the unit time interval. In addition, the power controller apparatus 4A according to the third embodiment may also employ an objective function described with reference to FIGS. 23 to 26 or other objective functions, instead of the objective function f, as the objective function including the characteristic value associated with the degree of degradation of each power storage apparatus 13 for the unit time interval.

INDUSTRIAL APPLICABILITY

The power system according to the present disclosure can be implemented as a "local-production and local-consumption power system" in which generated power of a customer facility is consumed by the customer facility itself, or by its neighboring customer facilities. It is possible to reduce initial investment cost of the power storage apparatuses, by using small-capacity power storage apparatuses. It is possible to minimize variations in charged electric energy, and operate the power storage apparatuses 13 over a long term without significant degradation.

REFERENCE SIGNS LIST

1-1 to 1-3, 1A, 1B, 1C: CUSTOMER FACILITY
2: POWER NETWORK
3: POWER COMPANY FACILITY
4, 4A: POWER CONTROLLER APPARATUS
5: POWER GRID CONTROLLER APPARATUS
10, 10A, 10B, 10C: CUSTOMER CONTROLLER APPARATUS
11: LOAD APPARATUS
12: POWER GENERATOR APPARATUS
13: POWER STORAGE APPARATUS
21: MEMORY DEVICE
22: PREDICTOR
23: REFERENCE CAPACITY DETERMINER
24: ACTUAL CAPACITY DETERMINER
25: CHARACTERISTIC VALUE DETERMINER
26: CHARGING AND DISCHARGING PLAN DETERMINER
101-1 to 101-3: POWER GRID FACILITY

The invention claimed is:

1. A power controller apparatus for a power system including a plurality of customer facilities connected to each other via a power network connected to a power supply facility,
wherein the plurality of customer facilities comprise load apparatuses, respectively, and at least two of the plurality of customer facilities further comprise power storage apparatuses, respectively, and
wherein the power controller apparatus is configured to:
predict demand power of each of the load apparatuses of the customer facilities for a unit time interval;
determine a reference capacity of each of the power storage apparatuses based on the demand power, the reference capacity indicating a capacity of each of the power storage apparatuses necessary to maintain power received by each of the customer facilities from the power supply facility at a first threshold or lower, under an assumption that power is not transmitted and received among the customer facilities;

determine an actual capacity of each of the power storage apparatuses based on the demand power, the actual capacity indicating a capacity of each of the power storage apparatuses necessary to maintain the power received by each of the customer facilities from the power supply facility at the first threshold or lower, under an assumption that power is transmitted and received among the customer facilities;

calculate a first characteristic value of each of the power storage apparatuses based on the demand power, the first characteristic value being associated with a degree of degradation of each of the power storage apparatuses for the unit time interval, under an assumption that power is not transmitted and received among the customer facilities, and that charging and discharging of each of the power storage apparatuses having the reference capacity are controlled so as to maintain the power received by each of the customer facilities from the power supply facility at the first threshold or lower;

calculate a second characteristic value of each of the power storage apparatuses based on the demand power, the second characteristic value being associated with the degree of degradation of each of the power storage apparatuses for the unit time interval, under an assumption that power is transmitted and received among the customer facilities, and that charging and discharging of each of the power storage apparatuses having the actual capacity are controlled so as to maintain the power received by each of the customer facilities from the power supply facility at the first threshold or lower, and determine a charging and discharging plan of the power storage apparatuses for the unit time interval so as to minimize an objective function indicating a degree of degradation from the first characteristic value to the second characteristic value; and control charging and discharging of each of the power storage apparatuses having the actual capacity in accordance with the charging and discharging plan.

2. The power controller apparatus as claimed in claim 1, wherein at least one of the plurality of customer facilities further comprises a power generator apparatus, and wherein the power controller apparatus is configured to predict generated power of the power generator apparatus for the unit time interval, determine the reference capacity and the actual capacity based on the demand power and the generated power, calculate the first and second characteristic values based on the demand power and the generated power, and determine the charging and discharging plan based on the demand power and the generated power.

3. The power controller apparatus as claimed in claim 1, wherein the reference capacity is determined so as to minimize a payback period of each of the power storage apparatuses.

4. The power controller apparatus as claimed in claim 1, wherein the power supply facility is a power company facility, and wherein the customer facilities are supplied with commercial power from the power company facility.

5. The power controller apparatus as claimed in claim 4, configured to calculate the first characteristic value under an assumption that charging and discharging of each of the power storage apparatuses are controlled so as to minimize an electricity price for the commercial power.

6. The power controller apparatus as claimed in claim 4, wherein the objective function includes an electricity price for the commercial power, and increases in response to the electricity price.

7. The power controller apparatus as claimed in claim 1, wherein some of the power storage apparatuses have predetermined actual capacities, respectively, and others of the power storage apparatuses have undetermined actual capacities, respectively, and wherein the power controller apparatus is configured to determine actual capacities of the power storage apparatuses having the undetermined actual capacities, respectively.

8. The power controller apparatus as claimed in claim 1, wherein each of the first and second characteristic values indicates a number of charging and discharging cycles of each of the power storage apparatuses, and an increase in the number of charging and discharging cycles represents degradation of the power storage apparatus, and represents degradation of the first and second characteristic values.

9. The power controller apparatus as claimed in claim 1, wherein each of the first and second characteristic values indicates an operation range in which a state of charge of each of the power storage apparatuses varies, and an expansion in the operation range represents an increase in likelihood of degradation of the power storage apparatus, and represents degradation of the first and second characteristic values.

10. The power controller apparatus as claimed in claim 1, wherein each of the first and second characteristic values indicates a duration during which a state of charge of each of the power storage apparatuses is equal to or higher than a second threshold, and an increase in the duration represents an increase in likelihood of degradation of the power storage apparatus, and represents degradation of the first and second characteristic values.

11. The power controller apparatus as claimed in claim 1, wherein each of the first and second characteristic values indicates an average of a state of charge of each of the power storage apparatuses, and an increase in the average represents an increase in likelihood of degradation of the power storage apparatus, and represents degradation of the first and second characteristic values.

12. The power controller apparatus as claimed in claim 1, wherein each of the first and second characteristic values indicates a number of times of switching between charging and discharging of each of the power storage apparatuses, and an increase in the number of times represents an increase in likelihood of degradation of the power storage apparatus, and represents degradation of the first and second characteristic values.

13. The power controller apparatus as claimed in claim 1, wherein each of the first and second characteristic values indicates a number of times of charging each of the power storage apparatuses and a number of times of discharging each of the power storage apparatuses, and an increase in the number of times represents an increase in likelihood of degradation of the power storage apparatus, and represents degradation of the first and second characteristic values.

14. The power controller apparatus as claimed in claim 1, wherein each of the first and second characteristic values indicates a range of rate at which a state of charge of each of the power storage apparatuses varies, and an expansion in the range of rate represents an increase in likelihood of degradation of the power storage apparatus, and represents degradation of the first and second characteristic values.

15. A power system including:
a plurality of customer facilities connected to each other via a power network; and
a power controller apparatus,
wherein the plurality of customer facilities comprise load apparatuses, respectively, and at least two of the plurality of customer facilities further comprise power storage apparatuses, respectively, and
wherein the power controller apparatus is configured to:
predict demand power of each of the load apparatuses of the customer facilities for a unit time interval;
determine a reference capacity of each of the power storage apparatuses based on the demand power, the reference capacity indicating a capacity of each of the power storage apparatuses necessary to maintain power received by each of the customer facilities from the power supply facility at a first threshold or lower, under an assumption that power is not transmitted and received among the customer facilities;
determine an actual capacity of each of the power storage apparatuses based on the demand power, the actual capacity indicating a capacity of each of the power storage apparatuses necessary to maintain the power received by each of the customer facilities from the power supply facility at the first threshold or lower, under an assumption that power is transmitted and received among the customer facilities;
calculate a first characteristic value of each of the power storage apparatuses based on the demand power, the first characteristic value being associated with a degree of degradation of each of the power storage apparatuses for the unit time interval, under an assumption that power is not transmitted and received among the customer facilities, and that charging and discharging of each of the power storage apparatuses having the reference capacity are controlled so as to maintain the power received by each of the customer facilities from the power supply facility at the first threshold or lower;
calculate a second characteristic value of each of the power storage apparatuses based on the demand power, the second characteristic value being associated with the degree of degradation of each of the power storage apparatuses for the unit time interval, under an assumption that power is transmitted and received among the customer facilities, and that charging and discharging of each of the power storage apparatuses having the actual capacity are controlled so as to maintain the power received by each of the customer facilities from the power supply facility at the first threshold or lower, and determine a charging and discharging plan of the power storage apparatuses for the unit time interval so as to minimize an objective function indicating a degree of degradation from the first characteristic value to the second characteristic value; and
control charging and discharging of each of the power storage apparatuses having the actual capacity in accordance with the charging and discharging plan.

16. A power controller apparatus for a power system including a plurality of customer facilities connected to each other via a power network connected to a power supply facility,
wherein the power system includes a plurality of power grid facilities, each of the plurality of power grid facilities including at least two of the plurality of customer facilities,
wherein the plurality of power grid facilities comprise load apparatuses, respectively, and at least two of the plurality of power grid facilities further comprise power storage apparatuses, respectively, and
wherein the power controller apparatus is configured to:
predict demand power of each of the load apparatuses of the power grid facilities for a unit time interval;
determine a reference capacity of each of the power storage apparatuses based on the demand power, the reference capacity indicating a capacity of each of the power storage apparatuses necessary to maintain power received by each of the power grid facilities from the power supply facility at a first threshold or lower, under an assumption that power is not transmitted and received among the power grid facilities;
determine an actual capacity of each of the power storage apparatuses based on the demand power, the actual capacity indicating a capacity of each of the power storage apparatuses necessary to maintain the power received by each of the power grid facilities from the power supply facility at the first threshold or lower, under an assumption that power is transmitted and received among the power grid facilities;
calculate a first characteristic value of each of the power storage apparatuses based on the demand power, the first characteristic value associated with a degree of degradation of each of the power storage apparatuses for the unit time interval, under an assumption that power is not transmitted and received among the power grid facilities, and that charging and discharging of each of the power storage apparatuses having the reference capacity are controlled so as to maintain the power received by each of the power grid facilities from the power supply facility at the first threshold or lower;
calculate a second characteristic value of each of the power storage apparatuses based on the demand power, the second characteristic value associated with the degree of degradation of each of the power storage apparatuses for the unit time interval, under an assumption that power is transmitted and received among the power grid facilities, and that charging and discharging of each of the power storage apparatuses having the actual capacity are controlled so as to maintain the power received by each of the power grid facilities from the power supply facility at the first threshold or lower, and determine a charging and discharging plan of the power storage apparatuses for the unit time interval so as to minimize an objective function indicating a degree of degradation from the first characteristic value to the second characteristic value; and
control charging and discharging of each of the power storage apparatuses having the actual capacity in accordance with the charging and discharging plan.

* * * * *